United States Patent
Tateishi et al.

(10) Patent No.: US 6,613,888 B2
(45) Date of Patent: Sep. 2, 2003

(54) AZO DYES, PROCESS FOR MAKING THE SAME, INK-JET PRINTING INK, INK-JET RECORDING METHOD

(75) Inventors: Keiichi Tateishi, Kanagawa (JP); Toshiki Fujiwara, Kanagawa (JP); Makoto Yamada, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 10/176,764

(22) Filed: Jun. 24, 2002

(65) Prior Publication Data
US 2003/0040608 A1 Feb. 27, 2003

Related U.S. Application Data

(62) Division of application No. 09/813,036, filed on Mar. 21, 2001, now Pat. No. 6,489,452.

(30) Foreign Application Priority Data

Mar. 22, 2000 (JP) .......................... 2000-80733
Jul. 21, 2000 (JP) ......................... 2000-220649

(51) Int. Cl.⁷ ..................... C09B 29/036; C09B 29/09; C09D 11/02
(52) U.S. Cl. ................. 534/775; 534/781; 534/784; 534/786; 534/792; 534/793
(58) Field of Search ................. 534/775, 781, 534/784, 786, 792, 793; 106/31.45, 31.5

(56) References Cited

U.S. PATENT DOCUMENTS

| | | | |
|---|---|---|---|
| 3,336,285 A | 8/1967 | Towne et al. | |
| 3,639,384 A | 2/1972 | Weaver et al. | |
| 4,301,070 A | 11/1981 | Giles et al. | |
| 4,650,861 A | 3/1987 | Weaver et al. | |
| 6,200,370 B1 * | 3/2001 | Fujiwara et al. | 106/31.48 |
| 6,455,679 B1 * | 9/2002 | Tateishi et al. | 534/766 |

FOREIGN PATENT DOCUMENTS

| | | |
|---|---|---|
| GB | 1 566 985 | 5/1980 |
| GB | 2 168 713 A | 6/1986 |
| JP | 55-161856 | 12/1980 |
| JP | 61-36362 | 2/1986 |
| JP | 6-19036 | 3/1994 |
| JP | 6-145543 | 5/1994 |
| JP | 7-224230 | 8/1995 |
| JP | 2001302952 | * 10/2001 |
| WO | 96/34916 | 11/1996 |

* cited by examiner

Primary Examiner—Fiona T. Powers
(74) Attorney, Agent, or Firm—Burns, Doane, Swecker & Mathis, LLP

(57) ABSTRACT

An azo dye represented by the following general formulae (10) and (12):

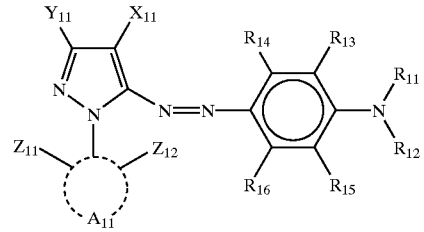

General formula (10)

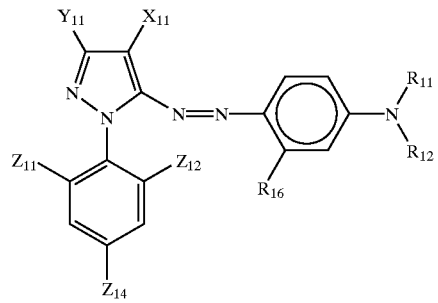

General formula (12)

(wherein the variables are as defined herein) and a process for making the azo dye is disclosed. The process comprises a step in which a diazonium salt is formed by the reaction between an aminopyrazole represented by the general formula (3) and an diazotizing agent, a step in which a compound represented by the general formula (5) is formed by the reaction between the diazonium salt and an aromatic coupling agent represented by the general formula (4), and a step in which an azo dye represented by the general formula (6) is formed by the reaction between the compound represented by the general formula (5) and an arylating agent or a heterylating agent in the presence of a base.

8 Claims, No Drawings

AZO DYES, PROCESS FOR MAKING THE SAME, INK-JET PRINTING INK, INK-JET RECORDING METHOD

This application is a divisional of application Ser. No. 09/813,036, filed on Mar. 21, 2001, now U.S. Pat. 6,489,452 the entire disclosure of which is hereby incorporated by reference.

BACKGROUND OF THE INVENTION

1. Field of the Invention

The present invention relates to a novel azo dye, a process for making the dye, an ink-jet printing ink using the dye, and an ink-jet recording method.

2. Description of the Related Art

In recent years, the mainstream of new image-recording materials has been materials for forming color images in particular. More specifically, these materials include recording materials based on ink-jet recording, heat-sensitive recording materials based on image transfer, pressure-sensitive recording materials, recording materials based on electronic photography, silver halide photosensitive materials based on transfer, printing inks, and recording pens. Because of inexpensive material costs, capability of high-speed recording, low noise in recording operations, and ease in color recording, ink-jet recording has rapidly come into wide use and is still making further progress. Ink-jet recording methods include a method in which liquid droplets, applied a pressure by a piezoelectric element, are ejected, a method in which liquid droplets are ejected by bubbles generated in the ink by heat, a method in which ultrasonic waves are used, and a method in which liquid droplets are suction-ejected by electrostatic force. In these methods, aqueous ink, oil-based ink, and solid (fusion-type) ink are used.

The properties required for the dye in the ink-jet printing ink are high solubility in a solvent, capability of high-density recording, excellent hue, excellent durability to light, heat, air, water, and chemicals, excellent fixing and little blur on image-receiving materials, excellent storability as ink, freedom from toxicity, high purity, and low cost of production. However, it is very difficult to obtain a dye that highly satisfies these requirements. In particular, there is a strong demand for a dye that has a good magenta hue and exhibits excellent lightfastness. Heretofore, various dyes have been disclosed as pyrazole azo dyes in Japanese Patent Application Laid-Open (JP-A) Nos. 55-161856, 61-36362, 61-152768, 6-145543, and 7-224230, U.S. Pat. Nos. 4,650, 861 and 4,301,070, PCT National Publication No. 11-504958 (WO 9634916), and so on. However, none of these dyes meets the requirements of hue and fastness at the same time.

Meanwhile, pyrazole azo dyes were heretofore synthesized according to methods disclosed in U.S. Pat. Nos. 3,336,285 and 3,639,384, U.K. Patent No. 1,566,985, and so on. According to the methods disclosed in the above-mentioned U.S. patents, a 1-alkyl-4-cyano-pyrazole-5-yl azo dye is synthesized via a step of diazotization and subsequent coupling of a 1-alkyl-4-cyano-5-aminopyrazole. However, since the diazonium salt to be formed in the step described above is very unstable, it is difficult to obtain the pyrazole azo dye with good yield and high purity (Weaver and Shuttleworth, Dyes and Pigments 3, 81(1982)). Besides, Japanese Patent Application Publication (JP-B) No. 6-19036 discloses a method of synthesizing a pyrazole azo dye. The 1-alkyl-3-(secondary or tertiary alkyl)-4-cyano-pyrazole-5-yl azo dyes obtained by this method have short-wave length hues and a dye satisfactory as a magenta dye has not been obtained.

According to the method disclosed in the above-mentioned U.K. Patent No. 1,566,985, a dye is synthesized by subjecting a 1-alkyl-3-alkyl- or aryl-4-cyano-pyrazole-5-yl azo dye and a 1-alkyl-3-alkyl- or aryl-4-halogeno-5-aminopyrazole to diazotization and coupling together with an aromatic coupling component, followed by substituting halogen in a 4-position with cyanide. Since a step of using a heavy metal cyanide such as CuCN or $Zn(CN)_2$ is involved, this method presents problems of waste disposal after use, purification of the dye to be formed, and the like.

SUMMARY OF THE INVENTION

It is an object of the present invention to solve the problems described above and to provide a novel azo dye having a good hue and capable of forming images having high lightfastness, an ink-jet printing ink using the dye, and an ink-jet recording method using the ink. Another object of the present invention is to provide a novel manufacturing process enabling production of the azo dye with a high yield. A further object is to provide a novel azo dye which is useful as a water-soluble dye or as a synthesis intermediate for the production of a water-soluble dye and which can become an intermediate of chemicals, drugs, and organic agricultural chemicals.

After close studies of pyrazolyl aniline azo dye derivatives having good hue and high lightfastness, the present inventors found that the above-described problems can be solved by a pyrazole-based azo dye having a specific structure hitherto unknown. Further, after close studies of the manufacturing process of the pyrazole-based azo dye, the present inventors found that the pyrazole-based azo dye can be obtained in a high yield by synthesis via a diazotization step, a coupling step, and an arylation or heterylation step. That is, the above-described objects were achieved by the following means.

A first aspect of the present invention is an azo dye which is represented by general formula (1) or (11) as follows.

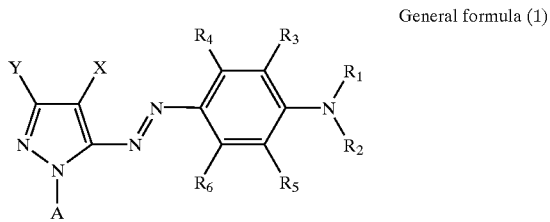

General formula (1)

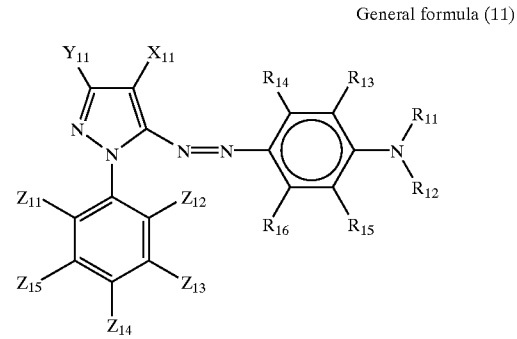

General formula (11)

In the general formula (1) and (11), X and $X_{11}$ represent an electron-withdrawing group having a Hammett's con stant $\sigma_p$ of at least 0.20; $R_1$, $R_2$, $R_{11}$ and $R_{12}$ each independently represents a substituted or unsubstituted one of an alkyl group, an alkenyl group, a cycloalkyl group, and an aralkyl group; $R_3$, $R_4$, $R_5$, $R_6$, $R_{13}$, $R_{14}$, $R_{15}$ and $R_{16}$ each independently represents one of a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclicoxy group, an azo group, an acyloxy group, a carbamoyloxy group, a silyloxy group, an aryloxycarbonyl group, an aryloxycarbonylamino group, an imido group, a heterocyclicthio group, a sulfinyl group, a phosphoryl group, an acyl group, and an ionic hydrophilic group, each of which groups may have at least one of substituent; and each of pair of $R_1$ and $R_2$, $R_3$ and $R_1$, $R_5$ and $R_2$, $R_{11}$ and $R_{12}$, $R_{13}$ and $R_{11}$, and $R_{15}$ and $R_{12}$ may be joined to form a ring; Y represents one of a secondary or tertiary alkyl group and a substituted or unsubstituted aryl group; A represents a group made up of nonmetallic atoms necessary for forming a 5- to 8-membered ring, which ring may have a substituent, may be a saturated ring, and may have an unsaturated bond; $Z_{11}$ and $Z_{12}$ each independently represents a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclicoxy group, an azo group, an acyloxy group, a carbamoyloxy group, a silyloxy group, an aryloxycarbonyl group, an aryloxycarbonylamino group, an imido group, a heterocyclicthio group, a sulfinyl group, a phosphoryl group, an acyl group, or an ionic hydrophilic group; and at least one of $R_{11}$, $R_{12}$, $R_{13}$, $R_{14}$, $R_{15}$, $R_{16}$, $X_{11}$, $Y_{11}$, $Z_{11}$, $Z_{12}$, $Z_{13}$, $Z_{14}$, and $Z_{15}$ represents an ionic hydrophilic group or has an ionic hydrophilic group as a substituent.

A second aspect of the present invention is a process for making an azo dye. The process comprises the steps of:

(a) forming a diazonium salt by reacting an aminopyrazole represented by the general formula (3) as follows:

General formula (3)

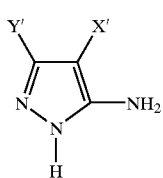

with a diazotizing agent;

(b) forming a compound represented by the general formula (5) as follows:

General formula (5)

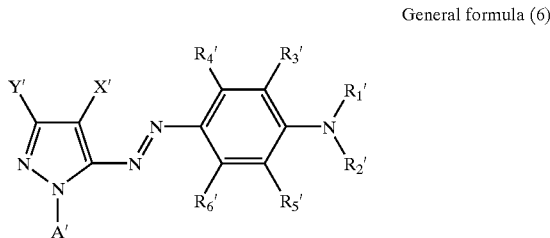

by reacting the diazonium salt with an aromatic coupling agent represented by the general formula (4) as folloes:

General formula (4)

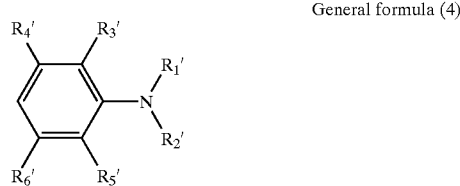

and;

(c) forming an azo dye represented by the general formula (6) as follows:

General formula (6)

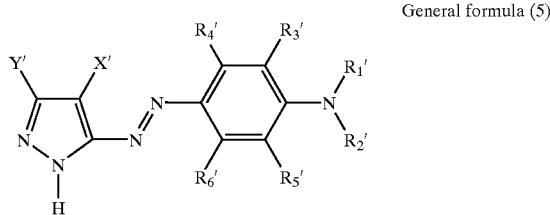

by reacting the compound represented by the general formula (5) with one of an arylating agent and a heterylating agent in the presence of a base. In the general formulas, X' represents an electron-withdrawing group having a Hammett's constant $\sigma_p$ of at least 0.20; $R_1'$ and $R_2'$ each independently represents a substituted or unsubstituted one of an alkyl group, an alkenyl group, a cycloalkyl group, and an aralkyl group; $R_3'$, $R_4'$, $R'_5$ and $R_6'$ each independently represents one of a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclicoxy group, an azo group, an acyloxy group, a carbamoyloxy group, a silyloxy group, an aryloxycarbonyl group, an aryloxycarbonylamino group, an imido group, a heterocyclicthio group, a sulfinyl group, a phosphoryl group, an acyl group, and an ionic hydrophilic group, each of which groups may have at least one of substituent; and each of pair of $R_1'$ and $R_2'$, $R_3'$ and $R_1'$, and $R_5'$ and $R_2'$ may be joined to form a ring; Y' represents one of a secondary or tertiary alkyl group and a substituted or unsubstituted aryl group; and A' represents a group made up of nonmetallic atoms necessary for forming a 5- to 8-membered ring, which ring may have a substituent, may be a saturated ring, and may have an unsaturated bond.

A third aspect of the present invention is an ink-jet printing ink containing an azo dye represented by following general formula (1), (10) or (11).

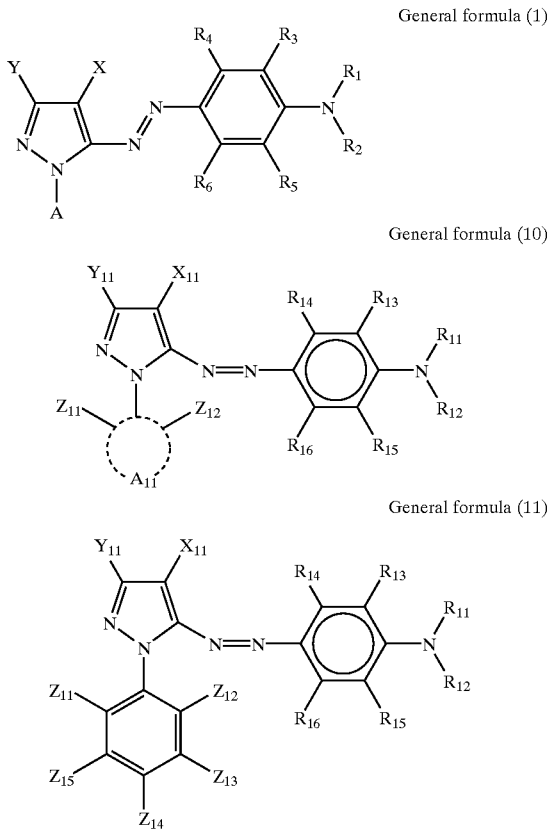

General formula (1)

General formula (10)

General formula (11)

In the general formula (1) and (11), X and $X_{11}$ represent an electron-withdrawing group having a Hammett's constant $\sigma_p$ of at least 0.20; $R_1$, $R_2$, $R_{11}$ and $R_{12}$ each independently represents a substituted or unsubstituted one of an alkyl group, an alkenyl group, a cycloalkyl group, and an aralkyl group; $R_3$, $R_4$, $R_5$, $R_6$, $R_{13}$, $R_{14}$, $R_{15}$ and $R_{16}$ each independently represents one of a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclicoxy group, an azo group, an acyloxy group, a carbamoyloxy group, a silyloxy group, an aryloxycarbonyl group, an aryloxycarbonylamino group, an imido group, a heterocyclicthio group, a sulfinyl group, a phosphoryl group, an acyl group, and an ionic hydrophilic group, each of which groups may have at least one of substituent; and each of pair of $R_1$ and $R_2$, $R_3$ and $R_1$, $R_5$ and $R_2$ $R_{11}$ and $R_{12}$, $R_{13}$ and $R_{11}$, and $R_{15}$ and $R_{12}$ may be joined to form a ring; Y represents one of a secondary or tertiary alkyl group and a substituted or unsubstituted aryl group; A represents a group made up of nonmetallic atoms necessary for forming a 5- to 8-membered ring, which ring may have a substituent, may be a saturated ring, and may have an unsaturated bond; $Z_{11}$ and $Z_{12}$ each independently represents a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclicoxy group, an azo group, an acyloxy group, a carbamoyloxy group, a silyloxy group, an aryloxycarbonyl group, an aryloxycarbonylamino group, an imido group, a heterocyclicthio group, a sulfinyl group, a phosphoryl group, an acyl group, or an ionic hydrophilic group; and at least one of $R_{11}$, $R_{12}$, $R_{13}$, $R_{14}$, $R_{15}$, $R_{16}$, $X_{11}$, $Y_{11}$, $Z_{11}$, $Z_{12}$, $Z_{13}$, $Z_{14}$, and $Z_{15}$ represents an ionic hydrophilic group or has an ionic hydrophilic group as a substituent.

In the general formula (10), $X_{11}$ represents an electron-withdrawing group having a Hammett's constant $\sigma_p$ of at least 0.20; $R_{11}$, $R_{12}$, $R_{13}$, $R_{14}$, $R_{15}$, $R_{16}$ and $Y_{11}$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclicoxy group, an azo group, an acyloxy group, a carbamoyloxy group, a silyloxy group, an aryloxycarbonyl group, an aryloxycarbonylamino group, an imido group, a heterocyclicthio group, a sulfinyl group, a phosphoryl group, an acyl group, or an ionic hydrophilic group; each of pairs $R_{11}$ and $R_{12}$, $R_{13}$ and $R_{11}$, and $R_{12}$ and $R_{15}$ may be joined to form a ring; $A_{11}$ represents a group made up of nonmetallic atoms necessary for forming a 5- to 8-membered ring, which may be a saturated ring and may have an unsaturated bond; at least 3 of the nonmetallic atoms in the group represented by $A_{11}$ are substituted with an N atom of a pyrazole ring, $Z_{11}$, and $Z_{12}$, respectively, such that the atom substituted with the N atom of the pyrazole ring is adjacent to both the atom substituted with $Z_{11}$ and the atom substituted with $Z_{12}$; $Z_{11}$ and $Z_{12}$ each independently represents a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclicoxy group, an azo group, an acyloxy group, a carbamoyloxy group, a silyloxy group, an aryloxycarbonyl group, an aryloxycarbonylamino group, an imido group, a heterocyclicthio group, a sulfinyl group, a phosphoryl group, an acyl group, or an ionic hydrophilic group; and at least one of $R_{11}$, $R_{12}$, $R_{13}$, $R_{14}$, $R_{15}$, $R_{16}$, $X_{11}$, $Y_{11}$, $Z_{11}$, $Z_{12}$, and $A_{11}$ represents an ionic hydrophilic group or has an ionic hydrophilic group as a substituent.

DESCRIPTION OF THE PREFERRED EMBODIMENTS

The details of the present invention are explained below. First, Hammett's constant of substitution $\sigma_p$ used herein is explained. Hammett's rule is an empirical rule proposed by L. P. Hammett in 1935 to quantitatively described the influence of a substituent on reaction or equilibrium of a benzene derivative. Currently, the appropriateness of this rule is widely recognized. $\sigma_p$ and $\sigma_m$ are constants of substitution obtained by Hammett's rule. These values are described in many common books. For example, details of these values are described in "Lange's Handbook of Chemistry", edited by J. A. Dean, 12 th edition, 1979 (McGraw-Hill), and "Extra Issue of Kagakuno Ryoiki", No.122, pp.96–103, 1979 (Nankodo Publishing Co., Ltd.). In the present invention, substituents are defined and explained by Hammett's constant of substitution $\sigma_p$. However, it must be noted that substituents are not necessarily limited to substituents for which Hammett's constants are known and described in these books. Therefore, needless to say, even if a Hammett's constant of a substituent is not described in these books, a substituent whose Hammett's constant will fall within a specified range when measured on the basis of Hammett's rule is included in the scope of the present invention. Although the compounds represented by the general formulaes (1) and (2-1) to (2-9) of the present invention are not benzene derivatives, the values of $\sigma_p$ are used as a scale which shows a electrical effect of substituent, irrespective of the positions of the substitution. In the present invention, values of $\sigma_p$ are used as stated above.

Details of the azo dyes represented by the following general formula (1) of the present invention are given below.

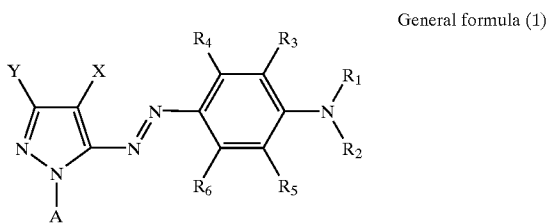

General formula (1)

wherein X represents an electron-withdrawing group having a Hammett's constant of substitution $\sigma_p$ of 0.20 or greater. Preferably, X is an electron-withdrawing group having a Hammett's constant $\sigma_p$ of 0.30 or greater and 1.0 or smaller. Specific examples of the electron-withdrawing group having a Hammett's constant $\sigma_p$ of 0.20 or greater include acyl groups, acyloxy groups, carbamoyl groups, alkyloxycarbonyl groups, aryloxycarbonyl groups, cyano groups, nitro groups, dialkylphosphono groups, diarylphosphono groups, diarylphosphinyl groups, alkylsulfinyl groups, arylsulfinyl groups, alkylsulfonyl groups, arylsulfonyl groups, sulfonyloxy groups, acylthio groups, sulfamoyl groups, thiocyanate groups, thiocarbonyl groups, halogenated alkyl groups, halogenated alkoxy groups, halogenated aryloxy groups, halogenated alkylamino groups, halogenated alkylthio groups, aryl groups substituted with other electron-withdrawing group having up value of 0.20 or greater, heterocyclic groups, halogen atoms, azo groups, and selenocyanate groups.

X may further have a substituent, and examples of such substituent include the following.

A halogen atom (e.g., a chlorine or bromine atom), a straight-chain or branched alkyl group having 1 to 12 carbon atoms, an aralkyl group having 7 to 18 carbon atoms, an alkenyl group having 2 to 12 carbon atoms, a straight-chain or branched alkynyl group having 2 to 12 carbon atoms, a straight-chain or branched cycloalkyl group having 3 to 12 carbon atoms, a straight-chain or branched cycloalkenyl group having 3 to 12 carbon atoms (e.g., methyl, ethyl, propyl, isopropyl, t-butyl, 2-methanesulfonylethyl, 3-phenoxypropyl, trifluoromethyl, or cyclopentyl), an aryl group (e.g., phenyl, 4-t-butylphenyl, or 2,4-di-t-amylphenyl), a heterocyclic group (e.g., imidazolyl, pyrazolyl, triazolyl, 2-furyl, 2-thienyl, 2-pyrimidinyl, or 2-benzotriazolyl), a cyano group, a hydroxyl group, a nitro group, a carboxyl group, an amino group, an alkyloxy group (e.g., methoxy, ethoxy, 2-methoxyethoxy, or 2-methanesulfonylethoxy), an aryloxy group (e.g., phenoxy, 2-methylphenoxy, 4-t-butylphenoxy, 3-nitrophenoxy, 3-t-butyloxycarbamoylphenoxy, or 3-methoxycarbamoyl), an acylamino group (e.g., acetamide, benzamide, or 4-(3-t-butyl-4-hydroxyphenoxy)butaneamide), an alkylamino group (e.g., methylamino, butylamino, diethylamino, or methylbutylamino), an anilino group (e.g., phenylamino or 2-chloroanilino), a ureido group (e.g., phenylureido, methylureido or N,N-dibutylureido), a sulfamoylamino group (e.g., N,N-dipropylsulfamoylamino), an alkylthio group (methylthio, octylthio, or 2-phenoxyethylthio), an arylthio group (e.g., phenylthio, 2-butoxy-5-t-octylphenylthio, or 2-carboxyphenylthio), an alkyloxycarbonylamino group (e.g., methoxycarbonylamino), a sulfonamide group (e.g., methanesulfonamide, benzenesulfoneamide, p-toluenesulfonamide, or octadecanesulfonamide), a carbamoyl group (e.g., N-ethylcarbamoyl or N,N-dibutylcarbamoyl), a sulfamoyl group (e.g., N-ethylsulfamoyl, N,N-dipropylsulfamonyl, or N,N-diethylsulfamoyl), a sulfonyl group (e.g., methanesulfonyl, octanesulfonyl, benzenesulfonyl, or toluenesulfonyl), an alkyloxycarbonyl group (e.g., methoxycarbonyl or butyloxycarbonyl), a heterocyclicoxy group (e.g., 1-phenyltetrazole-5-oxy or 2-tetrahydropyranyloxy), an azo group (e.g., phenylazo, 4-methoxyphenylazo, 4-pivaloylaminophenylazo, or 2-hydroxy-4-propanoylphenylazo), an acyloxy group (e.g., acetoxy), a carbamoyloxy group (e.g., N-methylcarbamoyloxy or N-phenylcarbamoyloxy), a silyloxy group (e.g., trimethylsilyloxy or dibutylmethylsilyloxy), an aryloxycarbonylamino group (e.g., phenoxycarbonylamino), an imide group (e.g., N-succinimide or N-phthalimide), a heterocyclicthio group (e.g., 2-benzothiazolylthio, 2,4-di-phenoxy-1,3,5-triazolei-6-thio, or 2-pyridylthio), a sulfinyl group (e.g., 3-phenoxypropylsulfinyl), a phosphonyl group (e.g., phenoxyphosphonyl, octyloxyphosphonyl, or phenylphosphonyl), an aryloxycarbonyl group (e.g., phenoxycarbonyl), and an acyl group (e.g., acetyl, 3-phenylpropanoyl, or benzoyl).

Preferable examples of X include acyl groups having 2 to 12 carbon atoms, acyloxy groups having 2 to 12 carbon atoms, carbamoyl groups having 1 to 12 carbon atoms, alkyloxycarbonyl groups having 2 to 12 carbon atoms, aryloxycarbonyl groups having 7 to 18 carbon atoms, cyano groups, nitro groups, alkylsulfinyl groups having 1 to 12 carbon atoms, arylsulfinyl groups having 6 to 18 carbon atoms, alkylsulfonyl groups having 1 to 12 carbon atoms, arylsulfonyl groups having 6 to 18 carbon atoms, sulfamoyl groups having 0 to 12 carbon atoms, halogenated alkyl groups having 1 to 12 carbon atoms, halogenated alkyloxy groups having 1 to 12 carbon atoms, halogenated alkylthio groups having 1 to 12 carbon atoms, halogenated aryloxy groups having 7 to 18 carbon atoms, aryl groups which have 7 to 18 carbon atoms and are substituted with 2 or more other electron-withdrawing groups each having a $\sigma_p$ value of 0.20 or greater, and heterocyclic groups which have 1 to 18 carbon atoms and at least one of nitrogen atom, oxygen atom, or sulfur atom.

More preferable examples of X are alkyloxycarbonyl groups having 2 to 12 carbon atoms, nitro groups, cyano groups, alkylsulfonyl groups having 1 to 12 carbon atoms, arylsulfonyl groups having 6 to 18 carbon atoms, carbamoyl groups having 1 to 12 carbon atoms, and halogenated alkyl groups having 1 to 12 carbon atoms. Particularly preferable examples of X are cyano groups, alkylsulfonyl groups having 1 to 12 carbon atoms, and arylsulfonyl groups having 6 to 18 carbon atoms. The most preferable examples of X are cyano groups.

In the general formula (1), $R_1$ and $R_2$ each independently represents a substituted or unsubstituted alkyl group, cycloalkyl group, aralkyl group, or alkenyl group.

Examples of alkyl groups represented by $R_1$ and $R_2$ include alkyl groups having one or more substituents, and unsubstituted alkyl groups. Preferably, the alkyl groups are alkyl groups having 1 to 12 carbon atoms. More preferably, the alkyl groups are alkyl groups having 1 to 6 carbon atoms. Examples of the substituent include a hydroxyl group, an alkoxy group, an alkoxycarbonyl group, a cyano group, a halogen atom, and an ionic hydrophilic group. Examples of the alkyl group include methyl, ethyl, butyl, isopropyl, t-butyl, hydroxyethyl, methoxyethyl, cyanoethyl, trifluoromethyl, 3-sulfopropyl, and 4-sulfobutyl.

Examples of cycloalkyl groups represented by $R_1$ and $R_2$ include cycloalkyl groups having one or more substituents, and unsubstituted cycloalkyl groups. The cycloalkyl groups are preferably cycloalkyl groups having 5 to 12 carbon atoms. Examples of the substituent include an ionic hydrophilic group. Examples of the cycloalkyl groups include a cyclohexyl group.

Examples of aralkyl groups represented by $R_1$ and $R_2$ include aralkyl groups having one or more substituents, and unsubstituted aralkyl groups. The aralkyl groups are preferably aralkyl groups having 7 to 12 carbon atoms. Examples of the substituent include an ionic hydrophilic group. Examples of the aralkyl groups include a benzyl group and a 2-phenethyl group.

Examples of alkenyl groups represented by $R_1$ and $R_2$ include alkenyl groups having one or more substituents, and unsubstituted alkenyl groups. The alkenyl groups are preferably alkenyl groups having 5 to 12 carbon atoms. Examples of the substituent include an ionic hydrophilic group. Examples of the alkenyl groups include a vinyl group and an allyl group.

$R_3$, $R_4$, $R_5$ and $R_6$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclicoxy group, an azo group, an acyloxy group, a carbamoyloxy group, a silyloxy group, an aryloxycarbonyl group, an aryloxycarbonylamino group, an imido group, a heterocyclicthio group, a sulfinyl group, a phosphoryl group, an acyl group, or an ionic hydrophilic group.

Of the groups listed above, $R_3$, $R_4$, $R_5$ and $R_6$ are preferably a hydrogen atom, a halogen atom, an alkyl group, an aryl group, a cyano group, an alkoxy group, an amido group, a ureido group, an alkoxycarbonylamino group, a sulfonamide group, a carbamoyl group, a sulfamoyl group, or an alkoxycarbonyl group. $R_3$, $R_4$, $R_5$ and $R_6$ are more preferably a hydrogen atom, a halogen atom, an alkyl group, an alkoxy group, an amido group, a ureido group, a sulfonamide group, a carbamoyl group, or a sulfamoyl group.

The halogen atoms represented by $R_3$, $R_4$, $R_5$ and $R_6$ include a fluorine atom, a chlorine atom, and a bromine atom.

Alkyl groups represented by $R_3$, $R_4$, $R_5$ and $R_6$ include alkyl groups having one or more substituents, and unsubstituted alkyl groups. Preferably, the alkyl groups are alkyl groups having 1 to 12 carbon atoms. Examples of the substituent include a hydroxyl group, an alkoxy group, a cyano group, a halogen atom, and an ionic hydrophilic group. Examples of the alkyl group include methyl, ethyl, butyl, isopropyl, t-butyl, hydroxyethyl, methoxyethyl, cyanoethyl, trifluoromethyl, 3-sulfopropyl, and 4-sulfobutyl.

Cycloalkyl groups represented by $R_3$, $R_4$, $R_5$ and $R_6$ include cycloalkyl groups having one or more substituents, and unsubstituted cycloalkyl groups. The cycloalkyl groups are preferably cycloalkyl groups having 5 to 12 carbon atoms. Examples of the substituent include an ionic hydrophilic group. Examples of the cycloalkyl groups include a cyclohexyl group.

Aralkyl groups represented by $R_3$, $R_4$, $R_5$ and $R_6$ include aralkyl groups having one or more substituents, and unsubstituted aralkyl groups. The aralkyl groups are preferably aralkyl groups having 7 to 12 carbon atoms. Examples of the substituents include an ionic hydrophilic group. Examples of the aralkyl groups include a benzyl group and a 2-phenethyl group.

Aryl groups represented by $R_3$, $R_4$, $R_5$ and $R_6$ include aryl groups having one or more substituents, and unsubstituted aryl groups. The aryl groups are preferably aryl groups having 7 to 12 carbon atoms. Examples of the substituent include an alkyl group, an alkoxy group, a halogen atom, an alkylamino group, and an ionic hydrophilic group. Examples of the aryl groups include phenyl, p-tolyl, p-methoxyphenyl, o-chlorophenyl, and m-(3-sulfopropylamino)phenyl.

Heterocyclic groups represented by $R_3$, $R_4$, $R_5$ and $R_6$ include heterocyclic groups having one or more substituents, and unsubstituted heterocyclic groups. The heterocyclic groups are preferably 5- or 6-membered heterocyclic groups. Examples of the substituent include an ionic hydrophilic group. Examples of the heterocyclic groups include a 2-pyridyl group, a 2-thienyl group, and a 2-furyl group.

Alkylamino groups represented by $R_3$, $R_4$, $R_5$ and $R_6$ include alkylamino groups having one or more substituents, and unsubstituted alkylamino groups. The alkylamino groups are preferably alkylamino groups having 1 to 6 carbon atoms. Examples of the substituent include an ionic hydrophilic group. Examples of the alkylamino groups include a methylamino group and a diethylamino group.

Alkoxy groups represented by $R_3$, $R_4$, $R_5$ and $R_6$ include alkoxy groups having one or more substituents, and unsubstituted alkoxy groups. The alkoxy groups are preferably alkoxy groups having 1 to 12 carbon atoms. Examples of the substituent include an alkoxy group, a hydroxyethyl group, and an ionic hydrophilic group. Examples of the alkoxy groups include a methoxy group, an ethoxy group, an isopropoxy group, a methoxyethoxy group, a hydroxyethoxy group, and a 3-carboxypropoxy group.

Aryloxy groups represented by $R_3$, $R_4$, $R_5$ and $R_6$ include aryloxy groups having one or more substituents, and unsubstituted aryloxy groups. The aryloxy groups are preferably aryloxy groups having 6 to 12 carbon atoms. Examples of the substituent include an alkoxy group and an ionic hydrophilic group. Examples of the aryloxy groups include a phenoxy group, a p-methoxyphenoxy group, and an o-methoxyphenoxy group.

Amido groups represented by $R_3$, $R_4$, $R_5$ and $R_6$ include amido groups having one or more substituents, and unsubstituted amido groups. The amido groups are preferably amido groups having 2 to 12 carbon atoms. Examples of the substituent include an ionic hydrophilic group. Examples of the amido groups include an acetamide group, a propionamide group, a benzamide group, and a 3,5-disulfobenzamide group.

Arylamino groups represented by $R_3$, $R_4$, $R_5$ and $R_6$ include arylamino groups having one or more substituent, and unsubstituted arylamino groups. The arylamino groups are preferably arylamino groups having 6 to 12 carbon atoms. Examples of the substituents include a halogen atom and an ionic hydrophilic group. Examples of the arylamino groups include an anilino group and a 2-chloroanilino group.

Ureido groups represented by $R_3$, $R_4$, $R_5$ and $R_6$ include ureido groups having one or more substituents, and unsubstituted ureido groups. The ureido groups are preferably ureido groups having 1 to 12 carbon atoms. Examples of the substituent include an alkyl group and an aryl group. Examples of the ureido groups include a 3-methylureido group, a 3,3-dimethylureido group, and a 3-phenylureido group.

Sulfamoylamino groups represented by $R_3$, $R_4$, $R_5$ and $R_6$ include sulfamoylamino groups having one or more substituents, and unsubstituted sulfamoylamino groups. Examples of the substituent include an alkyl group. Examples of the sulfamoylamino groups include an N,N-dipropylsulfamoylamino group.

Alkylthio groups represented by $R_3$, $R_4$, $R_5$ and $R_6$ include alkylthio groups having one or more substituents, and unsubstituted alkylthio groups. The alkylthio groups are preferably alkylthio groups having 1 to 12 carbon atoms. Examples of the substituent include an ionic hydrophilic group. Examples of the alkylthio groups include a methylthio group and an ethylthio group.

Arylthio groups represented by $R_3$, $R_4$, $R_5$ and $R_6$ include arylthio groups having one or more substituents, and unsubstituted arylthio groups. The arylthio groups are preferably arylthio groups having 6 to 12 carbon atoms. Examples of the substituent include an alkyl group and an ionic hydrophilic group. Examples of the arylthio groups include a phenylthio group and a p-tolylthio group.

Alkoxycarbonylamino groups represented by $R_3$, $R_4$, $R_5$ and $R_6$ include alkoxycarbonylamino groups having one or more substituents, and unsubstituted alkoxycarbonylamino groups. The alkoxycarbonylamino groups are preferably alkoxycarbonylamino groups having 2 to 12 carbon atoms. Examples of the substituent include an ionic hydrophilic group. Examples of the alkoxycarbonylamino groups include an ethoxycarbonylamino group.

Sulfonamide groups represented by $R_3$, $R_4$, $R_5$ and $R_6$ include sulfonamide groups having one or more substituents, and unsubstituted sulfonamide groups. The sulfonamide groups are preferably sulfonamide groups having 1 to 12 carbon atoms. Examples of the substituent include an ionic hydrophilic group. Examples of the sulfonamide groups include a methanesulfonamide group, a benzenesulfonamide group, and a 3-carboxybenzenesulfonamide group.

Carbamoyl groups represented by $R_3$, $R_4$, $R_5$ and $R_6$ include carbamoyl groups having one or more substituents, and unsubstituted carbamoyl groups. Examples of the substituent include an alkyl group. Examples of the carbamoyl groups include a methylcarbamoyl group and a dimethylcarbamoyl group.

Sulfamoyl groups represented by $R_3$, $R_4$, $R_5$ and $R_6$ include sulfamoyl groups having one or more substituents, and unsubstituted sulfamoyl groups. Examples of the substituent include an alkyl group. Examples of the sulfamoyl groups include a dimethylsulfamoyl group and a di-(2-hydroxyethyl)sulfamoyl group.

Sulfonyl groups represented by $R_3$, $R_4$, $R_5$ and $R_6$ include a methanesulfonyl group and a phenylsulfonyl group.

Alkoxycarbonyl groups represented by $R_3$, $R_4$, $R_5$ and $R_6$ include alkoxycarbonyl groups having one or more substituents, and unsubstituted alkoxycarbonyl groups. The alkoxycarbonyl groups are preferably alkoxycarbonyl groups having 2 to 12 carbon atoms. Examples of the substituent include an ionic hydrophilic group. Examples of the alkoxycarbonyl groups include a methoxycarbonyl group and an ethoxycarbonyl group.

Heterocyclicoxy groups represented by $R_3$, $R_4$, $R_5$ and $R_6$ include heterocyclicoxy groups having one or more substituents, and unsubstituted heterocyclicoxy groups. The heterocyclicoxy groups are preferably heterocyclicoxy groups having a 5- or 6-membered heterocycle. Examples of the substituent include a hydroxyl group and an ionic hydrophilic group. Examples of the heterocyclicoxy groups include a 2-tetrahydropyranyloxy group.

Azo groups represented by $R_3$, $R_4$, $R_5$ and $R_6$ include azo groups having one or more substituents, and unsubstituted azo groups. Examples of the azo groups include a p-nitrophenyl azo group.

Acyloxy groups represented by $R_3$, $R_4$, $R_5$ and $R_6$ include acyloxy groups having one or more substituents, and unsubstituted acyloxy groups. The acyloxy groups are preferably acyloxy groups having 1 to 12 carbon atoms. Examples of the substituent include an ionic hydrophilic group. Examples of the acyloxy groups include an acetoxy group and a benzoyloxy group.

Carbamoyloxy groups represented by $R_3$, $R_4$, $R_5$ and $R_6$ include carbamoyloxy groups having one or more substituents, and unsubstituted carbamoyloxy groups. Examples of the substituent include an alkyl group. Examples of the carbamoyloxy groups include an N-methylcarbamoyloxy group.

Silyloxy groups represented by $R_3$, $R_4$, $R_5$ and $R_6$ include silyloxy groups having one or more substituents, and unsubstituted silyloxy groups. Examples of the substituent include an alkyl group. Examples of the silyloxy groups include a trimethylsilyloxy group.

Aryloxycarbonyl groups represented by $R_3$, $R_4$, $R_5$ and $R_6$ include aryloxycarbonyl groups having one or more substituents, and unsubstituted aryloxycarbonyl groups. The aryloxycarbonyl groups are preferably aryloxycarbonyl groups having 7 to 12 carbon atoms. Examples of the substituent include an ionic hydrophilic group. Examples of the aryloxycarbonyl groups include a phenoxycarbonyl group.

Aryloxycarbonylamino groups represented by $R_3$, $R_4$, $R_5$ and $R_6$ include aryloxycarbonylamino groups having one or more substituents, and unsubstituted aryloxycarbonylamino groups. The aryloxycarbonylamino groups are preferably aryloxycarbonylamino groups having 7 to 12 carbon atoms. Examples of the substituent include an ionic hydrophilic group. Examples of the aryloxycarbonylamino groups include a phenoxycarbonylamino group.

Imido groups represented by $R_3$, $R_4$, $R_5$ and $R_6$ include imido groups having one or more substituents, and unsubstituted imido groups. Examples of the imido groups include an N-phthalimido group and an N-succinimido group.

Heterocyclicthio groups represented by $R_3$, $R_4$, $R_5$ and $R_6$ include heterocyclicthio groups having one or more substituents, and unsubstituted heterocyclicthio groups. The heterocyclicthio groups preferably have a 5- or 6-membered heterocycle. Examples of the substituent include an ionic hydrophilic group. Examples of the heterocyclicthio groups include a 2-pyridylthio group.

Sulfinyl groups represented by $R_3$, $R_4$, $R_5$ and $R_6$ include sulfinyl groups having one or more substituents, and unsubstituted sulfinyl groups. Examples of the sulfinyl groups include a phenylsulfinyl group.

Phosphoryl groups represented by $R_3$, $R_4$, $R_5$ and $R_6$ include phosphoryl groups having one or more substituents, and unsubstituted phosphoryl groups. Examples of the phosphoryl groups include a phenoxyphosphoryl group and a phenylphosphoryl group.

Acyl groups represented by $R_3$, $R_4$, $R_5$ and $R_6$ include acyl groups having one or more substituents, and unsubstituted acyl groups. The acyl groups are preferably acyl groups having 1 to 12 carbon atoms. Examples of the substituent include an ionic hydrophilic group. Examples of the acyl groups include an acetyl group and a benzoyl group.

Ionic hydrophilic groups represented by $R_3$, $R_4$, $R_5$ and $R_6$ include a carboxyl group, a sulfo group, and a quaternary ammonium group. The ionic hydrophilic groups are preferably a carboxyl group and a sulfo group and particularly preferably a sulfo group. The carboxyl group and sulfo group may each be in a state of a salt. Examples of a counter ion that forms the salt include alkali metal ions (e.g., a sodium ion or a potassium ion) and organic cations (e.g., tetramethylguanidinium ion).

In the general formula (1), $R_1$ and $R_2$, $R_3$ and $R_1$, and $R_5$ and $R_2$ may each form a ring. Where the ring is formed, preferable examples of the ring are as given below.

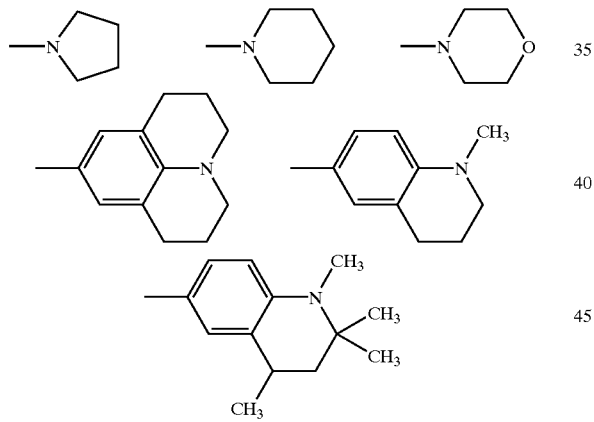

In the general formula (1), Y represents a secondary or tertiary alkyl group or, alternatively, a substituted or unsubstituted aryl group. Y is preferably a secondary or tertiary alkyl group and more preferably a tertiary alkyl group. Specific examples thereof include an isopropyl group, a t-butyl group, and an aryl group. These substituents may be further substituted with such substituents as a hydroxyl group, an alkoxy group, a cyano group, alkyl group, a sulfamoyl group, an amido group, a carbamoyl group, a halogen atom, or an ionic hydrophilic group.

In the general formula (1), A represents a group made up of nonmetallic atoms necessary for forming a 5- to 8-membered ring. This ring may have a substituent. Further, this ring may be a saturated ring or may have an unsaturated bond. Preferable examples of the nonmetallic atoms include a nitrogen atom, an oxygen atom, a sulfur atom, and a carbon atom.

Examples of A include a benzene ring, a cyclopentane ring, a cyclohexane ring, a cycloheptane ring, a cyclooctane ring, a cyclohexene ring, a pyridine ring, a piperazine ring, an oxane ring, and a thiane ring. When these rings further have a substituent, examples of the substituent include those listed above as examples of the substituents $R_3$, $R_4$, $R_5$ and $R_6$.

Preferably, A is any one of the groups represented by the following general formulae (2-1) to (2-9).

General formula (2-1)

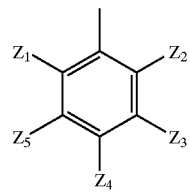

General formula (2-2)

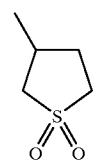

General formula (2-3)

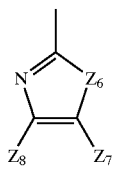

General formula (2-4)

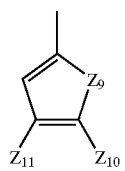

General formula (2-5)

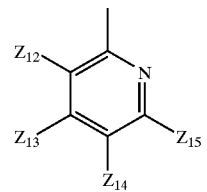

General formula (2-6)

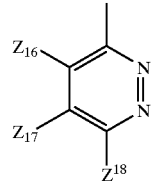

General formula (2-7)

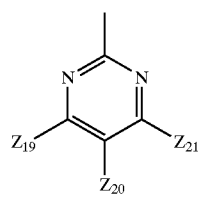

-continued

General formula (2-8)

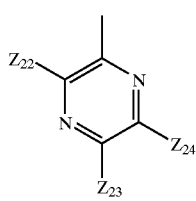

General formula (2-9)

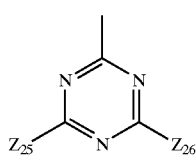

In the formulae described above, $Z_1$ and $Z_2$ each independently represents a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclicoxy group, an azo group, an acyloxy group, a carbamoyloxy group, a silyloxy group, an aryloxycarbonyl group, an aryloxycarbonylamino group, an imido group, a heterocyclicthio group, a sulfinyl group, a phosphoryl group, an acyl group, or an ionic hydrophilic group.

In the formulae described above, $Z_3$, $Z_4$, $Z_5$, $Z_7$, $Z_8$, $Z_{10}$, $Z_{11}$, $Z_{12}$, $Z_{13}$, $Z_{14}$, $Z_{15}$, $Z_{16}$, $Z_{17}$, $Z_{18}$, $Z_{19}$, $Z_{20}$, $Z_{21}$, $Z_{22}$, $Z_{23}$, $Z_{24}$, $Z_{25}$, and $Z_{26}$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclicoxy group, an azo group, an acyloxy group, a carbamoyloxy group, a silyloxy group, an aryloxycarbonyl group, an aryloxycarbonylamino group, an imido group, a heterocyclicthio group, a sulfinyl group, a phosphoryl group, an acyl group, or an ionic hydrophilic group.

$Z_6$ and $Z_9$ each independently represents N—R, an oxygen atom, or a sulfur atom. R has the same meaning as $Z_3$, $Z_4$ and $Z_5$.

In the general formula (2-1), specific examples of the groups represented by $Z_1$, $Z_2$, $Z_3$, $Z_4$, and $Z_5$ include the groups listed as specific examples of the groups represented by the substituents $R_3$, $R_4$, $R_5$, and $R_6$ in the general formula (1).

In the general formula (2-1), preferably, $Z_1$ and $Z_2$ are each a halogen atom, an alkyl group, an aryl group, a cyano group, a nitro group, an alkoxy group, an amido group, a ureido group, a sulfamoylamino group, an alkoxycarbonylamino group, a sulfonamide group, a carbamoyl group, a sulfamoyl group, a sulfonyl group, an alkoxycarbonyl group, an acyloxy group, a carbamoyloxy group, an imido group, a sulfinyl group, a phosphoryl group, an acyl group, or an ionic hydrophilic group.

In the general formula (2-1), preferably, $Z_3$, $Z_4$ and $Z_5$ are each a hydrogen atom, a halogen atom, an alkyl group, an aryl group, a cyano group, a nitro group, an alkoxy group, an amido group, a ureido group, a sulfamoylamino group, an alkoxycarbonylamino group, a sulfonamide group, a carbamoyl group, a sulfamoyl group, a sulfonyl group, an alkoxycarbonyl group, an acyloxy group, a carbamoyloxy group, an imido group, a sulfinyl group, a phosphoryl group, an acyl group, or an ionic hydrophilic group.

Further, in the general formula (2-1), preferably at least two of $Z_1$, $Z_2$, $Z_3$, $Z_4$ and $Z_5$ are substituted with substituents whose sum of the values of $\sigma_p$ is 0.4 or greater.

In the general formula (2-1), preferably, $Z_1$ and $Z_2$ are each independently a halogen atom, a cyano group, a nitro group, an alkoxy group, an amido group, a ureido group, a sulfamoylamino group, an alkoxycarbonylamino group, a sulfonamide group, a sulfonyl group, or an ionic hydrophilic group; more preferably, $Z_3$, $Z_4$ and $Z_5$ are each independently a hydrogen atom, a halogen atom, a cyano group, a nitro group, an alkoxy group, an amido group, a ureido group, a sulfamoylamino group, an alkoxycarbonylamino group, a sulfonamide group, a sulfonyl group, or an ionic hydrophilic group; and most preferably, at least two of $Z_1$, $Z_2$, $Z_3$, $Z_4$ and $Z_5$ are substituted with substituents whose sum of the values of $\sigma_p$ is 0.4 or greater.

In the general formulae (2-3) to (2-9), specific examples of the groups represented by $Z_7$, $Z_8$, $Z_{10}$, $Z_{11}$, $Z_{12}$, $Z_{13}$, $Z_{14}$, $Z_{15}$, $Z_{16}$, $Z_{17}$, $Z_{18}$, $Z_{19}$, $Z_{20}$, $Z_{21}$, $Z_{22}$, $Z_{23}$, $Z_{24}$, $Z_{25}$, and $Z_{26}$ include the groups listed as the specific examples of the groups represented by the substituents $R_3$, $R_4$, $R_5$, and $R_6$ in the general formula (1). In particular, preferably, $Z_7$, $Z_8$, $Z_{10}$, $Z_{11}$, $Z_{12}$, $Z_{13}$, $Z_{14}$, $Z_{15}$, $Z_{16}$, $Z_{17}$, $Z_{18}$, $Z_{19}$, $Z_{20}$, $Z_{21}$, $Z_{22}$, $Z_{23}$, $Z_{24}$, $Z_{25}$, and $Z_{26}$ are each a hydrogen atom, a halogen atom, an alkyl group, a cyano group, a nitro group, an alkoxy group, an amido group, a ureido group, a sulfamoylamino group, an alkoxycarbonylamino group, a sulfonamide group, a carbamoyl group, a sulfamoyl group, a sulfonyl group, an alkoxycarbonyl group, an acyloxy group, a carbamoyloxy group, an imido group, a sulfinyl group, a phosphoryl group, an acyl group, or an ionic hydrophilic group.

More preferably, $Z_7$, $Z_8$, $Z_{10}$, $Z_{11}$, $Z_{12}$, $Z_{13}$, $Z_{14}$, $Z_{15}$, $Z_{16}$, $Z_{17}$, $Z_{18}$, $Z_{19}$, $Z_{20}$, $Z_{21}$, $Z_{22}$, $Z_{23}$, $Z_{24}$ $Z_{25}$, and $Z_{26}$ are each a hydrogen atom, a halogen atom, a cyano group, a nitro group, an alkoxy group, an amido group, a ureido group, a sulfamoylamino group, an alkoxycarbonylamino group, a sulfonamide group, a sulfonyl group, or an ionic hydrophilic group.

The preferable scope of the azo dyes represented by the general formula (1) are the azo dyes represented by any one of the following general formulae (7-1) to (7-9). The groups in the following general formulae (7-1) to (7-9) have the same respective meanings as the groups, in the general formula (1) and the general formulae (2-1) to (2-9).

General formula (7-1)

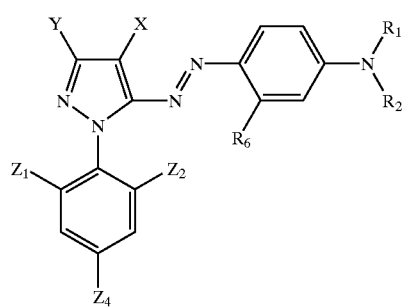

General formula (7-2)
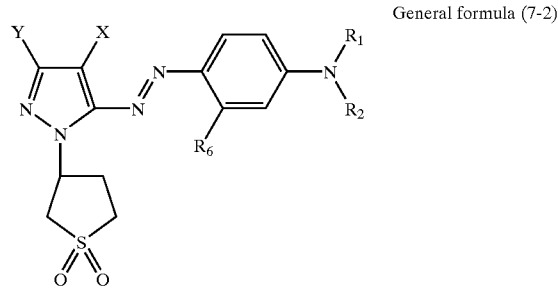

General formula (7-3)
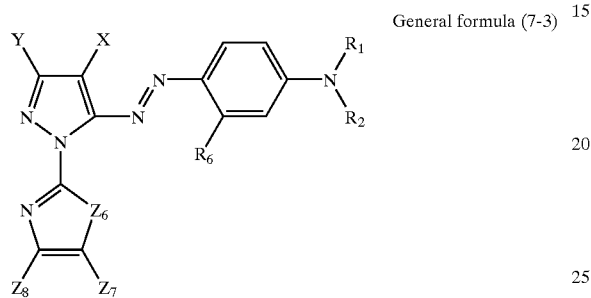

General formula (7-4)
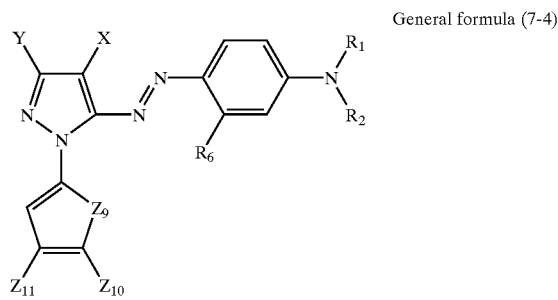

General formula (7-5)
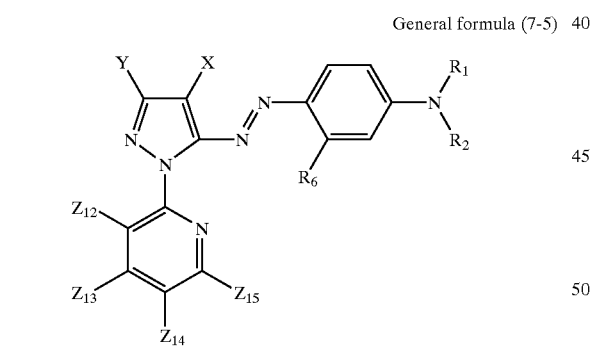

General formula (7-6)
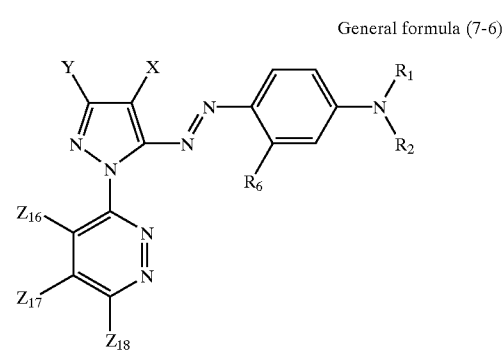

General formula (7-7)
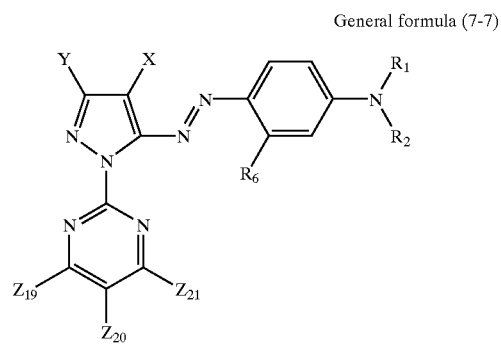

General formula (7-8)
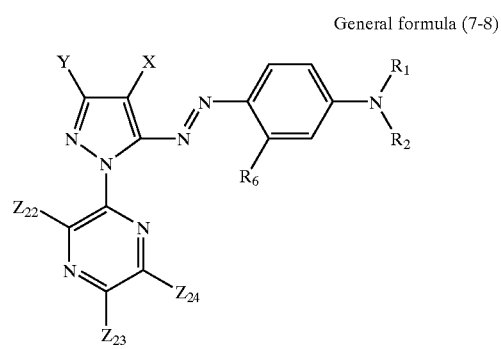

General formula (7-9)
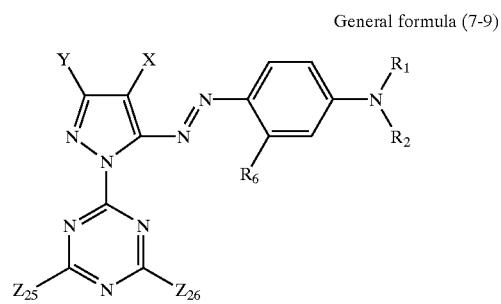

Of the azo dyes represented by the general formula (1) the most preferable combination of substituents is as follows. X is a cyano group, an alkylsulfonyl group having 1 to 12 carbon atoms, or an arylsulfonyl group having 6 to 18 carbon atoms, and is most preferably a cyano group; Y is a secondary or tertiary alkyl or aryl group, and is most preferably a t-butyl group; $R_1$ and $R_2$ are each independently an alkyl group (which may have an ionic hydrophilic group as a substituent); $R_6$ is an amido group, a ureido group, a sulfamoylamino group, an alkoxycarbonylamino group, or a sulfonamide group, and is most preferably an amido group, a ureido group, or a sulfonamide group (which may have an ionic hydrophilic group as a substituent); $Z_1$ and $Z_2$ are each independently a halogen atom or an alkyl group; and $Z_4$ is a hydrogen atom, a halogen atom, an amido group, a sulfonamide group, a carbamoyl group, a sulfamoyl group, an alkoxycarbonyl group or an ionic hydrophilic group, and is most preferably an amido group.

Specific examples of the azo dyes (indicated as exemplary compounds 1-1 to 1-36) are given below. However, it should be noted that the present invention is not limited to these specific examples.

1-1
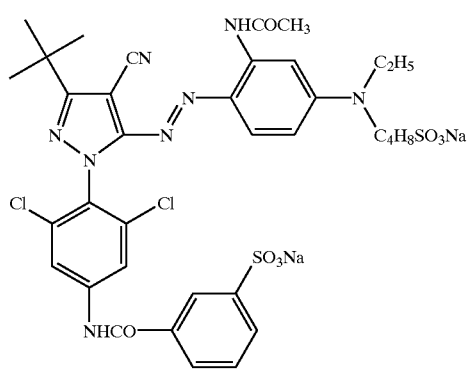
1-2
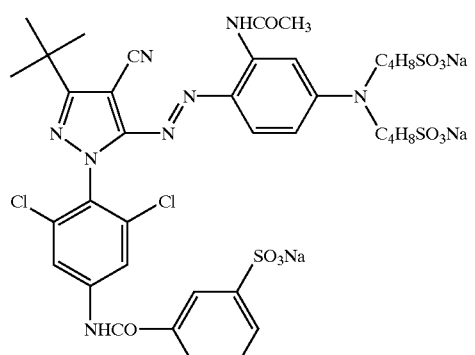
1-3
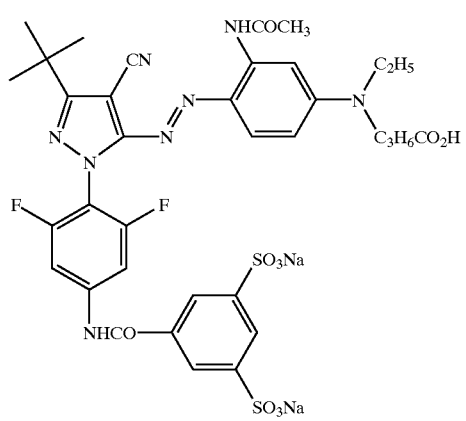
1-4
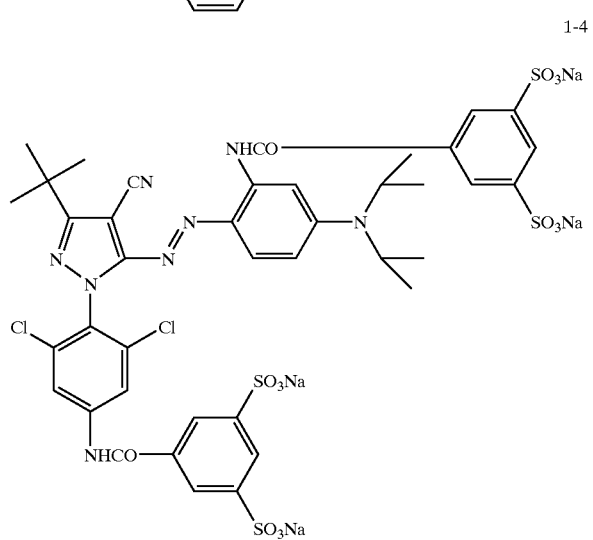
1-5
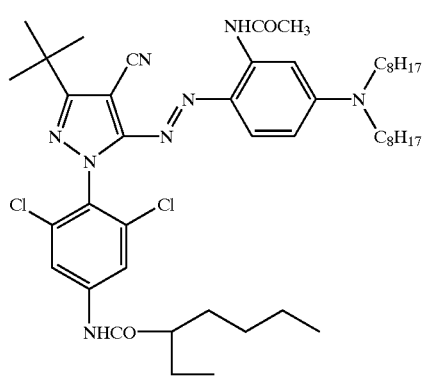
1-6
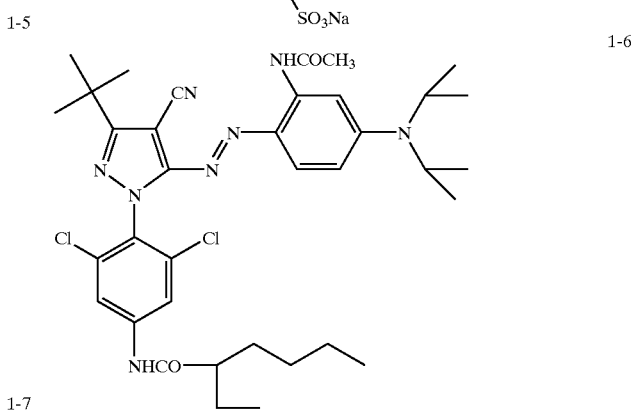
1-7
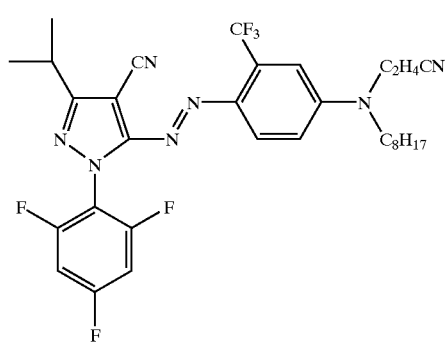
1-8
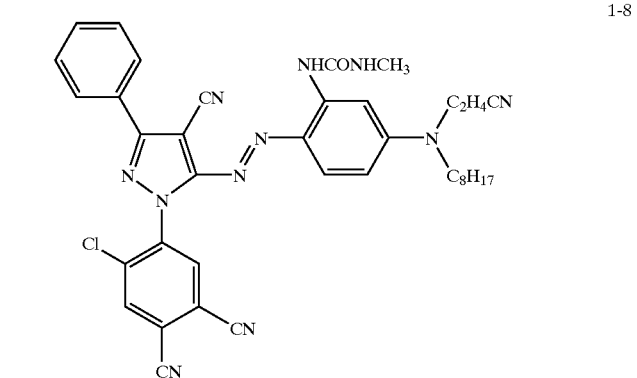

1-9
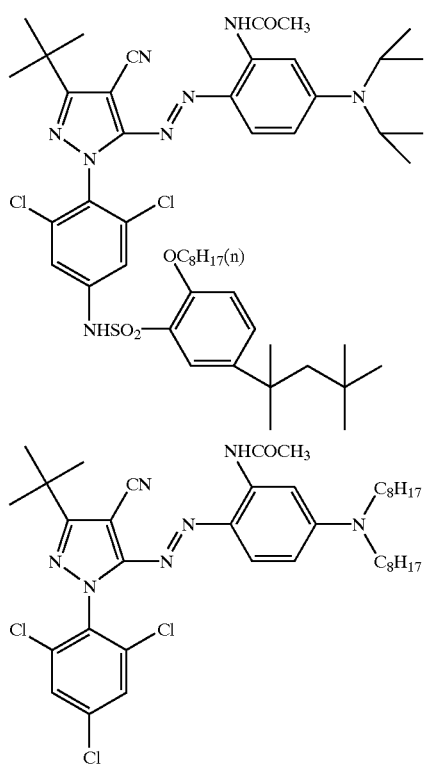
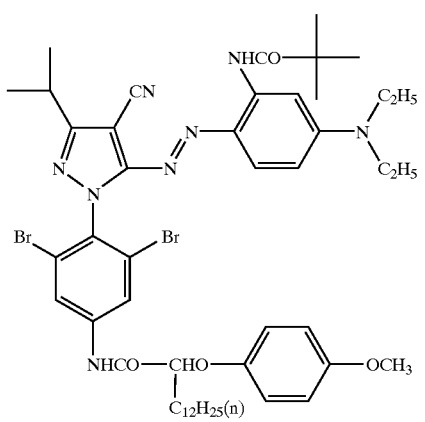
1-10
1-11
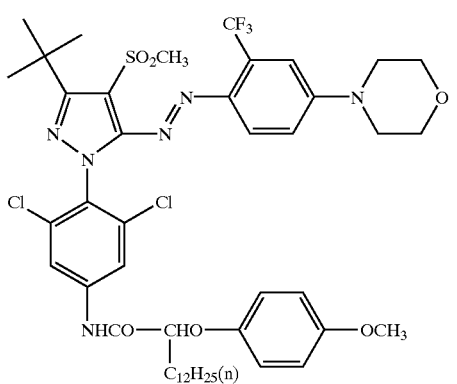
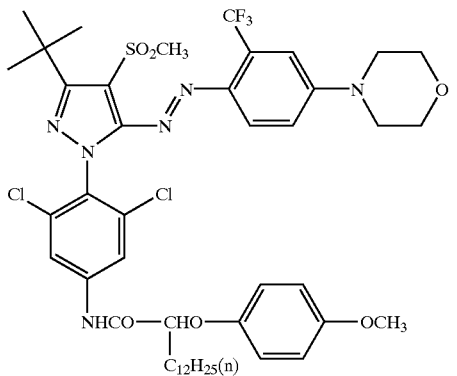
1-12
1-13
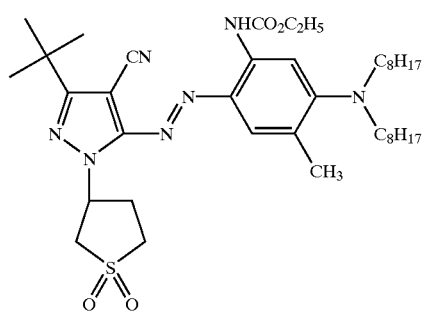
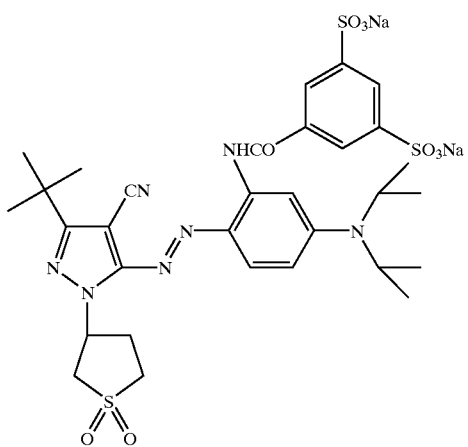
1-14
1-15
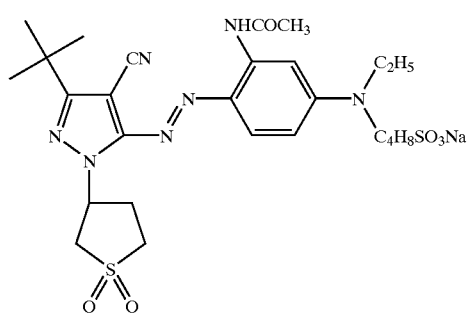
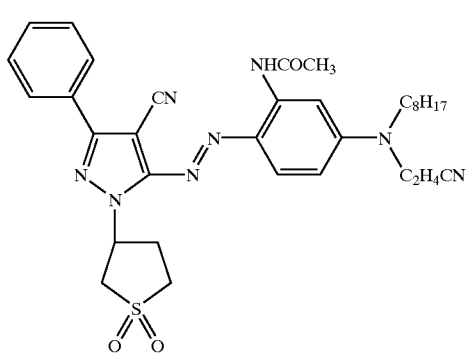
1-16

1-17 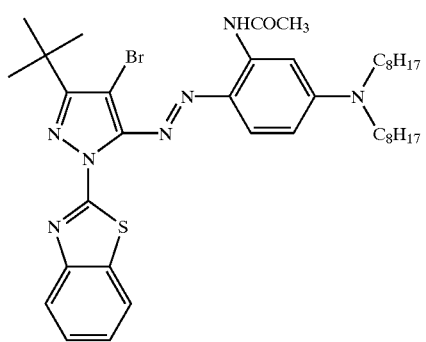
1-18 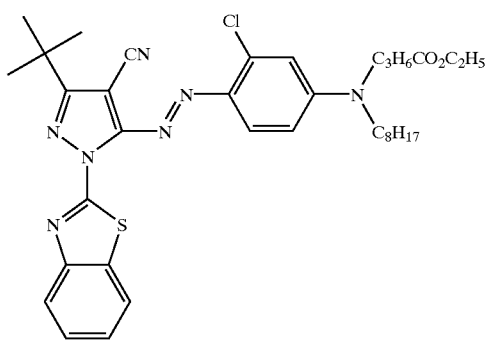
1-19 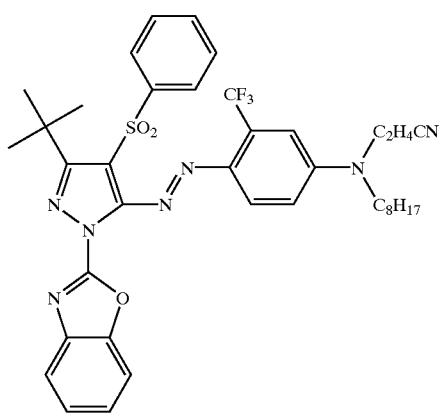
1-20 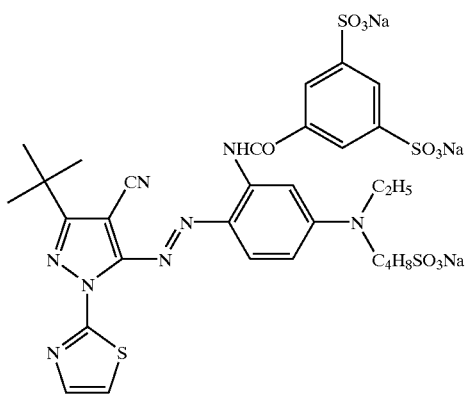
1-21 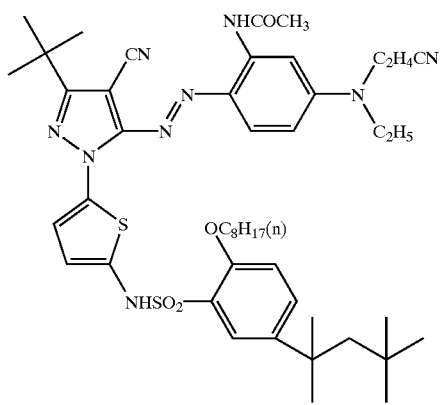
1-22 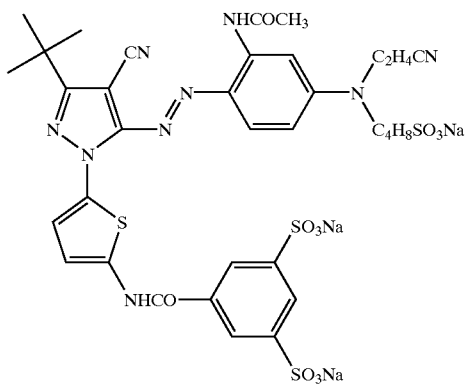
1-23 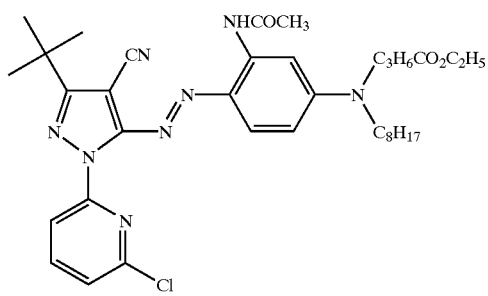
1-24 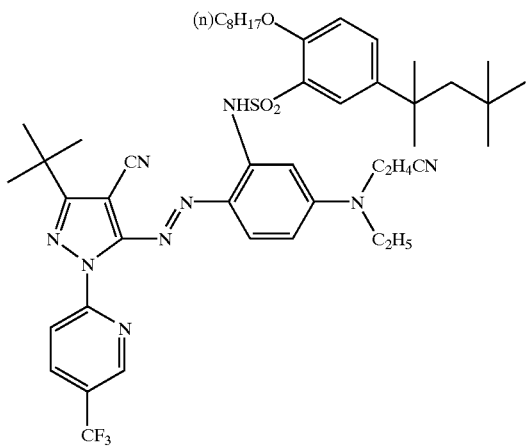

1-25
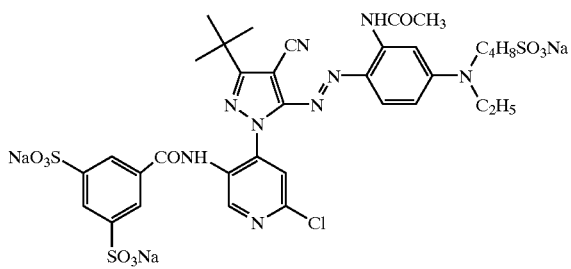
1-26
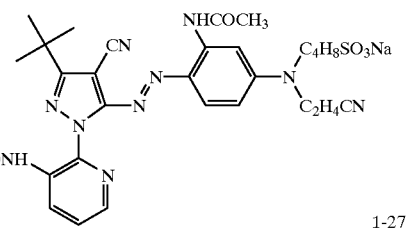
1-27
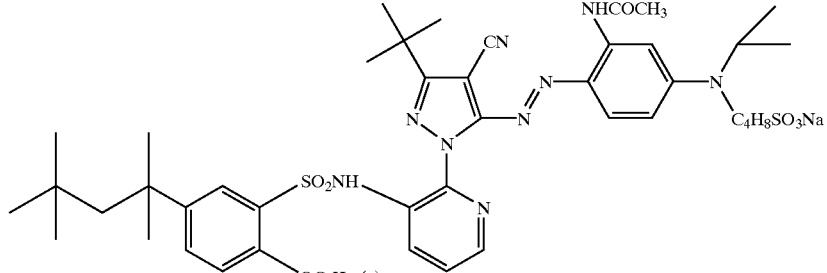
1-28
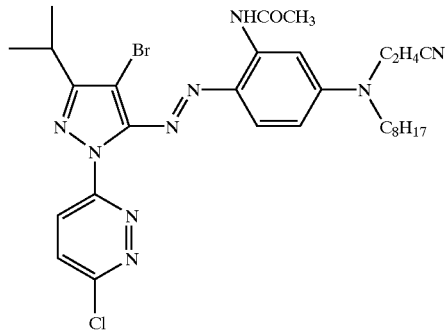
1-29
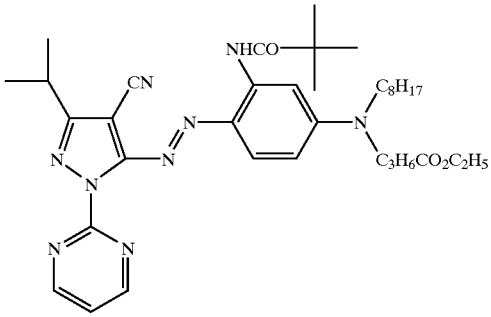
1-30
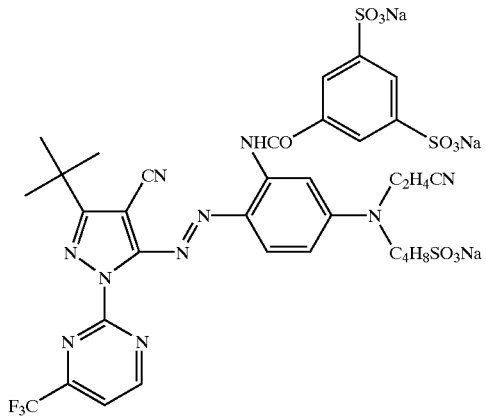
1-31
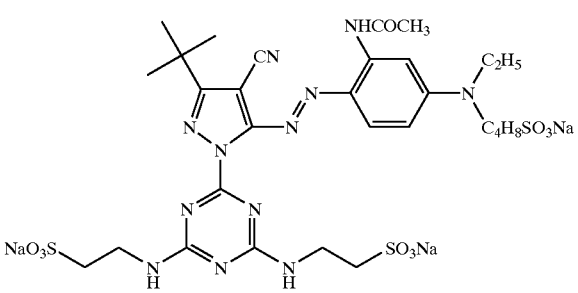
1-32
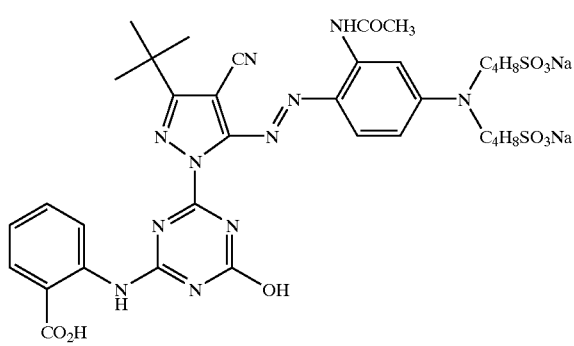
1-33
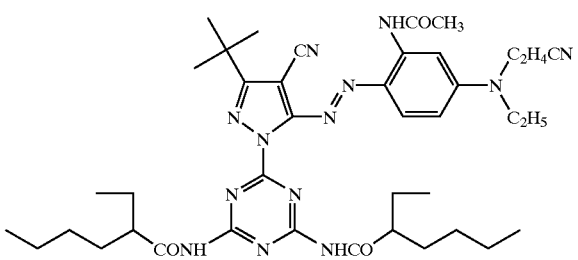

1-34

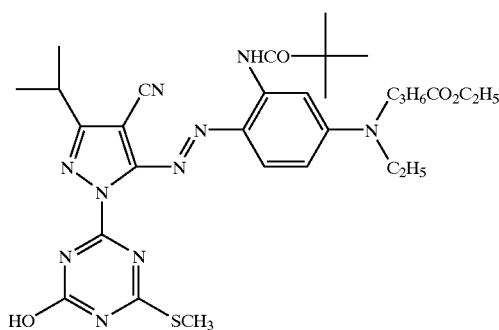

1-35

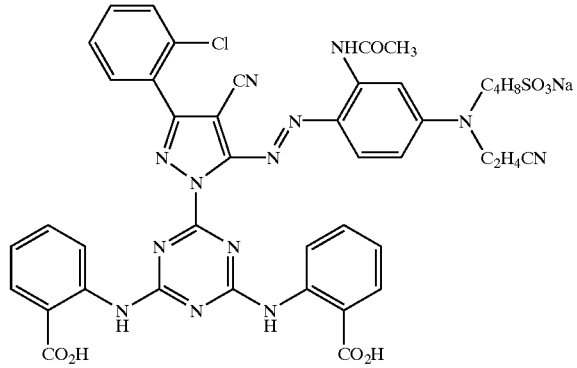

1-36

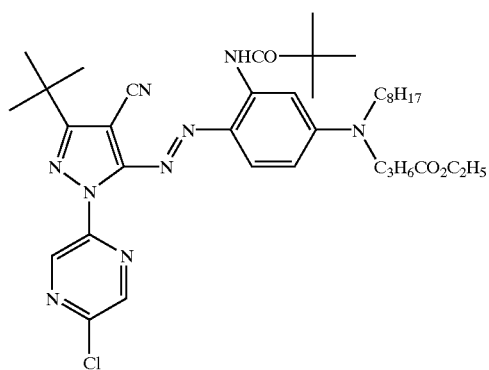

Next, the process for making the azo dyes of the present invention is explained in detail below.

The process for making the azo dyes of the present invention has (a) a step in which a diazonium salt is formed by a reaction between an aminopyrazole represented by a general formula (3) and a diazotizing agent, (b) a step in which an azo dye represented by a general formula (5) is formed by a reaction between the diazonium salt and an aromatic coupling agent represented by a general formula (4), and (c) a step in which an azo dye represented by a general formula (6) is formed by the reaction between the azo dye represented by the general formula (5) and an arylating agent or a heterylating agent in the presence of a base.

Further, after the step (c), a step in which a substituent is introduced into A' by using a suitable reagent may be added.

General formula (3)

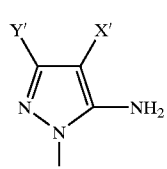

General formula (4)

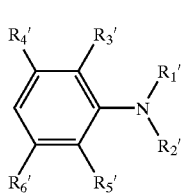

General formula (5)

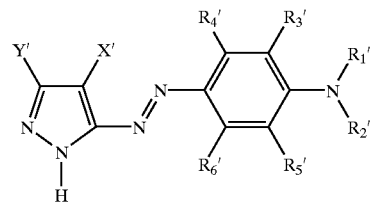

General formula (6)

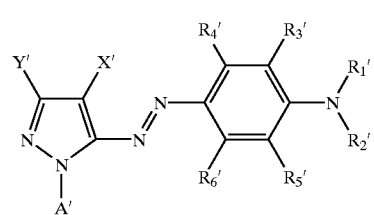

In the general formulae described above, X', Y', $R'_1$, $R'_2$, $R'_3$, $R'_4$, $R'_5$, $R'_6$ and A' have the same respective meanings as X, Y, $R_1$, $R_2$, $R_3$, $R_4$, $R_5$, $R_6$ and A in the general formula (1).

By carrying out the steps (a) to (c), a pyrazole azo dye (e.g., a 1-aryl- or heteryl-3-secondary or tertiary alkyl-4-cyano-pyrazole-5-yl azo dye or a 1-aryl- or heteryl-3-aryl-4-cyano-pyrazole-5-yl azo dye) represented by the general formula (5) can be synthesized as a high-purity product with a good yield. If a pyrazole azo dye which is obtained without carrying out the steps (a) to (c), such as a dye having no secondary or tertiary alkyl or aryl in a 3-position (e.g., a 4-cyano-pyrazolyl azo dye), was alkylated, a mixture of a pyrazole-3-yl azo dye and a pyrazole-5-yl azo dye would be formed. Since hue of the pyrazole-3-yl azo dye is different from a desired hue of the pyrazole-5-yl azo dye (i.e., the pyrazole-3-yl azo dye absorbs light having lower wavelengths), these dyes would need to be separated from each other so as to obtain the desired hue, but separation is difficult. However, if a pyrazole azo dye is prepared by carrying out the steps (a) to (c), the above-described disadvantage does not occur because the pyrazole-3-yl azo dye is not formed. On the other hand, if a pyrazole azo dye (e.g., a 1,3-dialkyl or 1-alkyl-3-aryl-4-cyano-pyrazole-5-yl azo dye) was synthesized by direct diazotization of a corresponding aminopyrazole (e.g., a 1-alkyl-3-aryl-4-cyano-5-aminopyrazole), the yield would be so low that this synthetic process cannot be practically used. In addition, the structure of an alkylhydrazine that is a raw material necessary for synthesis of the aminopyrazole (e.g., 1-alkyl-4-cyano-5-aminopyrazole) is limited and the synthesis of such alkylhydrazine is often difficult. According to the process of the present invention, the above-mentioned raw material is not necessary and the azo dyes can be produced in a stable manner and in a high yield.

The diazotizing agent that is used in the step (a) is preferably sodium nitrite dissolved in a dilute aqueous hydrochloric acid solution. In addition, isopentyl nitrite or nitrosyl sulfuric acid in trifluoroacetic acid can also be used as the diazotizing agent.

The aromatic coupling agent that is used in the step (b) is preferably a 3-acetamide-N,N-dialkylaniline.

Examples of the arylating agent or heterylating agent that is used in the step (c) include the compounds represented by the following general formulae (8-1) to (8-9).

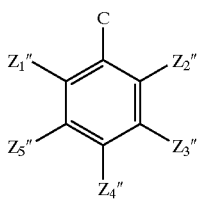

General formula (8-1)

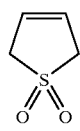

General formula (8-2)

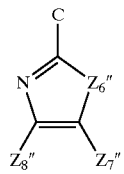

General formula (8-3)

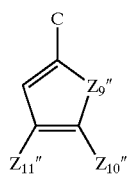

General formula (8-4)

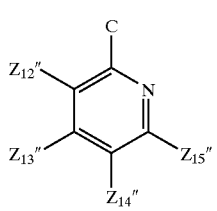

General formula (8-5)

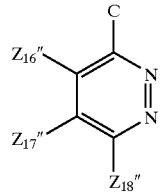

General formula (8-6)

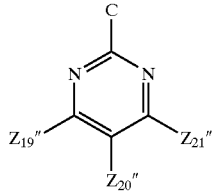

General formula (8-7)

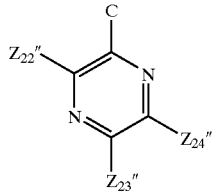

General formula (8-8)

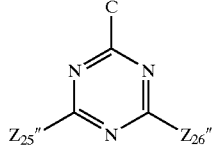

General formula (8-9)

$Z''_1$ to $Z''_{26}$ in the general formulae (8-1) to (8-9) have the same respective meanings as $Z_1$ to $Z_{26}$ in the general formulae (2-1) to (2-9). It is preferable that $Z''_1$ to $Z''_5$ are substituted with substituents whose sum of the Hammett constants $\sigma_p$ is 0.15 or greater or that $Z''_4$ is a nitro group. C represents a halogen atom or —$OSO_2R'$. R' represents an alkyl group or aryl group such as an a phenyl group.

Examples of the base that is used in the step (C) include organic bases such as tetrabutylammonium hydroxide and diisopropylethylamine; and inorganic bases such as potassium carbonate, sodium carbonate, sodium hydrogencarbonate, potassium hydrogencarbonate, sodium hydroxide, and potassium hydroxide.

An example of reaction formulae of the process described previously is given below.

Step (a)

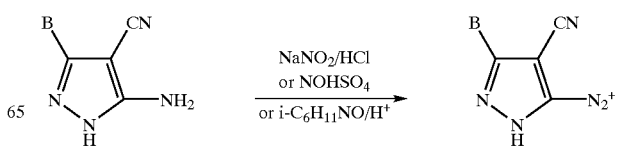

Step (b)

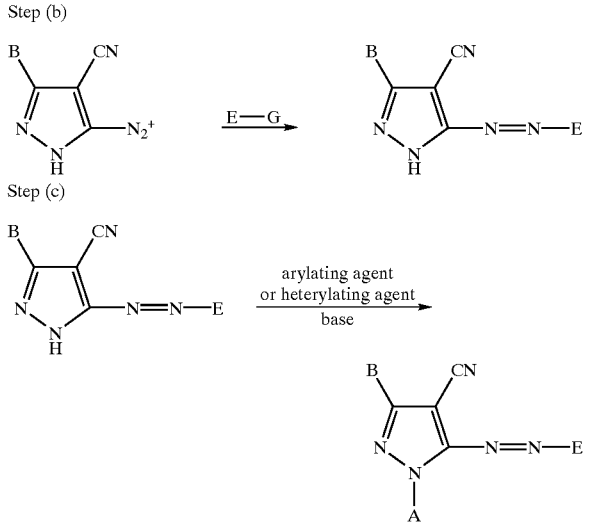

Step (c)

In the formulae, B represents t-butyl, isopropyl, phenyl, or the like; E represents substituted aminophenyl, tetrahydroquinolyl, julolidinyl, or the like; and G represents a hydrogen atom that can be replaced with a diazonium salt.

The starting materials represented by the general formula (3) to be used in the process (particularly secondary or tertiary alkyl-4-cyano-5-aminopyrazole and 3-aryl-4-cyano-5-aminopyrazole in the reaction formulae described above) can be synthesized by the processes described in U.S. Pat. No. 3,336,285, "Heterocycles", 20, 519(1983), and JP-B No. 6-19036.

The exemplary compounds 1-1 to 1-36 can be prepared by the process of the present invention.

Next, azo dyes represented by the following general formula (10) are described in detail.

General formula (10)

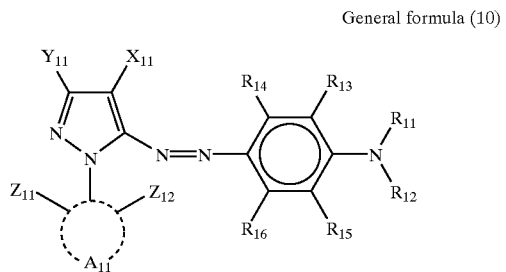

In the general formula (10), $X_{11}$ is an electron-withdrawing group whose Hammett substituent constant $\sigma_p$ is 0.20 or greater and preferably 0.30 or greater. The upper limit value of the constant is 1.0 for the electron-withdrawing group. Specific examples for $X_{11}$ of an electron-withdrawing group whose Hammett substituent constant $\sigma_p$ is 0.20 or greater are the same as those for X in the general formula (1); and preferences are also the same. Where $X_{11}$ has a substituent, specific examples of the substituent are the same as those of X in the general formula (1); and preferences are also the same.

In the general formula (10), $R_{11}$, $R_{12}$, $R_{13}$, $R_{14}$, $R_{15}$, $R_{16}$ and $Y_{11}$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclicoxy group, an azo group, an acyloxy group, a carbamoyloxy group, a silyloxy group, an aryloxycarbonyl group, an aryloxycarbonylamino group, an imido group, a heterocyclicthio group, a sulfinyl group, a phosphoryl group, an acyl group, or an ionic hydrophilic group.

Among these groups, particularly preferable are a hydrogen atom, a halogen atom, an alkyl group, an aryl group, a cyano group, an alkoxy group, an amido group, a ureido group, an alkoxycarbonylamino group, a sulfonamide group, a carbamoyl group, a sulfamoyl group, and an alkoxycarbonyl group.

The groups represented by $R_{11}$ to $R_{16}$ and $Y_{11}$ have the same respective meanings as $R_3$ to $R_6$ in the general formula (1), and preferences are also the same.

In the general formula (10), $R_{11}$ and $R_{12}$, $R_{13}$ and $R_{11}$, and $R_{15}$ and $R_{12}$ may each form a ring. Where a ring is formed, preferable examples thereof are the same as the preferable examples of the rings that may be formed, respectively, by $R_1$ and $R_2$, $R_3$ and $R_1$, and $R_5$ and $R_2$ in the general formula (1).

In the general formula (10), $A_{11}$, represents a group made up of nonmetallic atoms necessary for forming a 5- to 8-membered ring (the ring represented by $A_{11}$ is hereinafter referred to as "ring $A_{11}$" upon occasion). The ring $A_{11}$ may be a saturated ring or may have an unsaturated bond. Preferable examples of the group made up of nonmetallic atoms are groups made up of one kind, or two or more kinds, of the atoms selected from a nitrogen atom, an oxygen atom, a sulfur atom, and a carbon atom. The group made up of carbon atoms alone is particularly preferable.

Specific examples of the ring $A_{11}$ are the same as those listed as examples of the ring A in the general formula (1) and preferences are also the same. Where the ring $A_{11}$ has a substituent, examples of the substituent are the same as those listed as examples of the substituent that may be bonded by the ring A.

In the general formula (10), at least 3 of the nonmetallic atoms forming the ring All are substituted with the N atom of a pyrazole ring, $Z_{11}$, and $Z_{12}$, respectively, in such a manner that the atom substituted with the N atom of a pyrazole ring is adjacent to both the atom substituted with $Z_{11}$ and the atom substituted with $Z_{12}$.

The ring $A_{11}$ is preferably a benzene ring. Particularly preferable is a benzene ring wherein, in addition to the N atom of the pyrazole ring, $Z_{11}$ and $Z_{12}$, the 4-position, in relation to the N atom of a pyrazole ring, is substituted with an ionic hydrophilic group (which may be substituted with the substituents described previously).

In the general formula (10), $Z_{11}$ and $Z_{12}$ each independently represents a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclicoxy group, an azo group, an acyloxy group, a carbamoyloxy group, a silyloxy group, an aryloxycarbonyl group, an aryloxycarbonylamino group, an imido group, a heterocyclicthio group, a sulfinyl group, a phosphoryl group, an acyl group, or an ionic hydrophilic group.

Among these groups, a halogen atom, an alkyl group, an aryl group, a cyano group, an alkoxy group, an amido group, a ureido group, an alkoxycarbonylamino group, a sulfonamide group, a carbamoyl group, a sulfamoyl group, an alkoxycarbonyl group, and an ionic hydrophilic group are preferable; a halogen atom, an alkyl group, and an alkoxy group are particularly preferable; and a halogen atom is most preferable.

The groups represented by $Z_{11}$ and $Z_{12}$ have the same respective meanings as the groups represented by $R_{11}$ to $R_{16}$ and $Y_{11}$, and preferences are also the same, except that $Z_{11}$ and $Z_{12}$ do not contain a hydrogen atom.

Among the azo dyes represented by the general formula (10), azo dyes represented by the following general formula (11) are preferable.

General Formula (11)

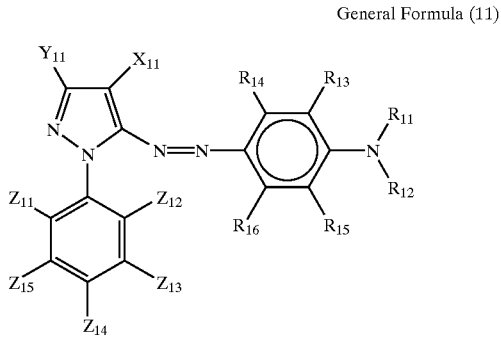

In the general formula (11), $X_{11}$, $Y_{11}$, $Z_{11}$, $Z_{12}$, $R_{11}$, $R_{12}$, $R_{13}$, $R_{14}$, $R_{15}$ and $R_{16}$ have the same meanings as $X_{11}$, $Y_{11}$, $Z_{11}$, $Z_{12}$, $R_{11}$, $R_{12}$, $R_{13}$, $R_{14}$, $R_{15}$ and $R_{16}$ in the general formula (10), respectively. The same applies to the preferable examples of $X_{11}$, $Y_{11}$, $Z_{11}$, $Z_{12}$, $R_{11}$, $R_{12}$, $R_{13}$, $R_{14}$, $R_{15}$ and $R_{16}$.

In the general formula (11), $Z_{13}$, $Z_{14}$ and $Z_{15}$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclicoxy group, an azo group, an acyloxy group, a carbamoyloxy group, a silyloxy group, an aryloxycarbonyl, group, an aryloxycarbonylamino group, an imido group, a heterocyclicthio group, a sulfinyl group, a phosphoryl group, an acyl group, or an ionic hydrophilic group.

Among these groups, a hydrogen atom, a halogen atom, an alkyl group, an aryl group, a cyano group, an alkoxy group, an amido group, a ureido group, an alkoxycarbonylamino group, a sulfonamide group, a carbamoyl group, a sulfamoyl group, an alkoxycarbonyl group, and an ionic hydrophilic group are particularly preferable.

Specific examples of $Z_{13}$, $Z_{14}$ and $Z_{15}$ include the groups listed as specific examples of the substituents $R_1$ to $R_6$ and Y in the general formula (1).

$Z_{13}$ and $Z_{15}$ are more preferably a hydrogen atom, a halogen atom, or an alkyl group, and particularly preferably a hydrogen atom.

$Z_{14}$ is preferably a hydrogen atom, a halogen atom, an alkyl group, an aryl group, a cyano group, an alkoxy group, an amido group, a ureido group, a sulfonamide group, a carbamoyl group, a sulfamoyl group, an alkoxycarbonyl group, or an ionic hydrophilic group; more preferably a hydrogen atom, an alkyl group, or an ionic hydrophilic group; and most preferably an ionic hydrophilic group.

Of the azo dyes represented by the general formula (11) a particularly preferable combination of the substituents is as follows. $X_{11}$ is a cyano group, an alkylsulfonyl group having 1 to 12 carbon atoms, or an arylsulfonyl group having 6 to 18 carbon atoms, and is particularly preferably a cyano group; $Y_{11}$ is a hydrogen atom, an alkyl group, or an aryl group and is particularly preferably a hydrogen atom; $R_{11}$ and $R_{12}$ are each an alkyl group (which may have an ionic hydrophilic group as a substituent) or an aryl group (which may have an ionic hydrophilic group as a substituent); $R_{13}$, $R_{14}$, and $R_{15}$ are each a hydrogen atom; $R_{16}$ is an amido group (which may have an ionic hydrophilic group as a substituent); $Z_{11}$ and $Z_{12}$ are each a halogen atom or an alkyl group; $Z_{13}$ and $Z_{15}$ are each a hydrogen atom, a halogen atom, or an alkyl group and is particularly preferably a hydrogen atom; and $Z_{14}$ is a hydrogen atom, a halogen atom, a sulfonamide group, a carbamoyl group, a sulfamoyl group, an alkoxycarbonyl group, or an ionic hydrophilic group, and is particularly preferably an ionic hydrophilic group.

A preferable combination of substituents of a compound represented by the general formula (11) is as follows. A compound in which at least one substituent among various substituents of the compound is one of the preferable group described above is preferable, a compound in which more substituents thereof are the preferable groups described above is more preferable, and the compound in which all substituents thereof are the preferable groups described above is most preferable.

However, it is necessary that, in the general formula (10), at least one of $R_{11}$, $R_{12}$, $R_{13}$, $R_{14}$, $R_{15}$, $R_{16}$, $X_{11}$, $Y_{11}$, $Z_{11}$, $Z_{12}$, and $A_{11}$ represents an ionic hydrophilic group or has an ionic hydrophilic group as a substituent, and that, in the general formula (11), at least one of $R_{11}$, $R_{12}$, $R_{13}$, $R_{14}$, $R_{15}$, $R_{16}$, $X_{11}$, $Y_{11}$, $Z_1$, $Z_2$, $Z_3$, $Z_4$, and $Z_5$ represents an ionic hydrophilic group or has an ionic hydrophilic group as a substituent. Because the azo dye represented by the general formula (10) or by the general formula (11) has in the molecule thereof at least one ionic hydrophilic group, solubility or dispersibility in an aqueous medium is good. Ionic hydrophilic groups as substituents of $R_{11}$ to $R_{16}$, $X_{11}$, $Y_{11}$, and $Z_{11}$ to $Z_{15}$ include a sulfo group, a carboxyl group, and a quaternary ammonium group. Among these groups, a sulfo group and a carboxyl group are preferable, and a sulfo group is particularly preferable. The carboxyl group and the sulfo group may each be in a state of a salt. Examples of a counter ion that forms the salt include alkali metal ions (e.g., a sodium ion or a potassium ion) and organic cations (e.g., a tetramethylguanidinium ion).

The azo dyes represented by the general formula (11) are more preferably the azo dyes having the structures represented by following general formula (12).

General formula (12)

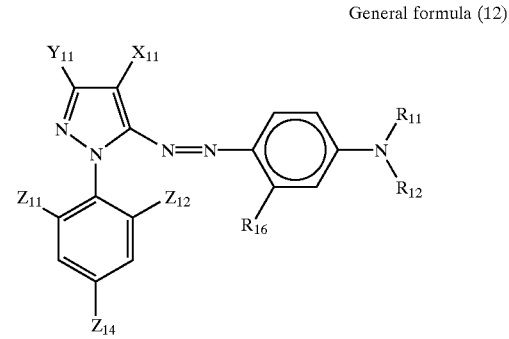

In the general formula (12), $X_{11}$, $Y_{11}$, $Z_{11}$, $Z_{12}$, $Z_{14}$, $R_{11}$, $R_{12}$ and $R_{16}$ have the same respective meanings as $X_{11}$, $Y_{11}$, $Z_{11}$, $Z_{12}$, $Z_{14}$, $R_{11}$, $R_{12}$ and $R_{16}$ in the general formula (11). The same applies to preferable examples of $X_{11}$, $Y_{11}$, $Z_{11}$, $Z_{12}$, $Z_{14}$, $R_{11}$, $R_{12}$ and $R_{16}$.

Of the azo dyes represented by the general formula (12), a particularly preferable combination of the substituents is as follows. $X_{11}$ is a cyano group, an alkylsulfonyl group having 1 to 12 carbon atoms, or an arylsulfonyl group having 6 to 18 carbon atoms, and is particularly preferably a cyano group; $Y_{11}$ is a hydrogen atom, an alkyl group, or an aryl group and is particularly preferably a hydrogen atom; $R_{11}$ and/or $R_{12}$ is an alkyl group (which may have an ionic hydrophilic group as a substituent) or an aryl group (which may have an ionic hydrophilic group as a substituent); $R_{16}$ is an amido group (which may have an ionic hydrophilic group as a substituent); $Z_{11}$ and/or $Z_{12}$ is a halogen atom or an alkyl group; and $Z_{14}$ is a hydrogen atom, a halogen atom, a sulfonamide group, a carbamoyl group, a sulfamoyl group, an alkoxycarbonyl group, or an ionic hydrophilic group, and is particularly preferably an ionic hydrophilic group.

A preferable combination of substituents of a compound represented by the general formula (12) is as follows. A compound in which at least one substituent among the various substituents of the compound is one of the preferable groups described above is preferable, a compound in which more substituents thereof are the preferable groups described above is more preferable, and a compound in which all substituents thereof are the preferable groups described above is most preferable.

Details of azo dyes which are represented by a general formula (13) and which are particularly preferable among the azo dyes represented by the general formula (11) are given below. The compounds, which are represented by the general formula (13) are useful as water-soluble dyes for ink-jet printing ink and also as synthetic intermediate products of water-soluble dyes. The compounds can also be useful intermediates for chemical products, drugs, or agricultural chemicals.

General Formula (13)

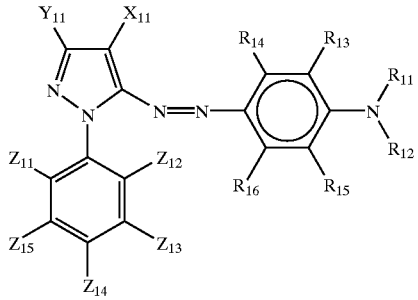

In the general formula (13), $X_{11}$, $Y_{11}$, $Z_{11}$, $Z_{12}$, $Z_{13}$, $Z_{14}$, $Z_{15}$, $R_{11}$, $R_{12}$, $R_{13}$, $R_{14}$, $R_{15}$, and $R_{16}$ have the same respective meanings as $X_{11}$, $Y_{11}$, $Z_{11}$, $Z_{12}$, $Z_{13}$, $Z_{14}$, $Z_{15}$, $R_{11}$, $R_{12}$, $R_{13}$, $R_{14}$, $R_{15}$, and $R_{16}$ in the general formula (11). The same applies to preferable examples of $X_{11}$, $Y_{11}$, $Z_{11}$, $Z_{12}$, $Z_{13}$, $Z_{14}$, $Z_{15}$, $R_{11}$, $R_{12}$, $R_{13}$, $R_{14}$, $R_{15}$, and $R_{16}$.

Among the azo dyes represented by the general formula (13), particularly preferable combinations of substituents are the same as the particularly preferable combinations of the substituents for the general formula (11).

A preferable combination of substituents of a compound represented by the general formula (13) is as follows. A compound in which at least one substituent among the various substituents thereof is one of the preferable groups described above is preferable, a compound in which more substituents thereof are the preferable groups described above is more preferable, and a compound in which all substituents thereof are the preferable groups described above is most preferable.

However, it is essential that, in the general formula (13), at least one of $R_{11}$, $R_{12}$, $R_{13}$, $R_{14}$, $R_{15}$, $R_{16}$, $X_{11}$, $Y_{11}$, $Z_{11}$, $Z_{12}$, $Z_{13}$, $Z_{14}$, and $Z_{15}$ represents an ionic hydrophilic group or has an ionic hydrophilic group as a substituent. Because the azo dye represented by the general formula (13) has in the molecule thereof at least one ionic hydrophilic group, solubility or dispersibility in an aqueous medium is good. Ionic hydrophilic groups as the substituents of $R_{11}$ to $R_{16}$, $X_{11}$, $Y_{11}$, and $Z_{11}$ to $Z_{15}$ include a sulfo group, a carboxyl group, and a quaternary ammonium group, of these groups, a sulfo group and a carboxyl group are preferable, and a sulfo group is particularly preferable. The carboxyl group and the sulfo group may each be in a state of a salt. Examples of the counter ion that forms the salt include alkali metal ions (e.g., a sodium ion or a potassium ion) and organic cations (e.g., a tetramethylguanidinium ion).

The azo dyes represented by the general formula (13) are more preferably azo dyes having structures represented by a following general formula (14).

General Formula (14)

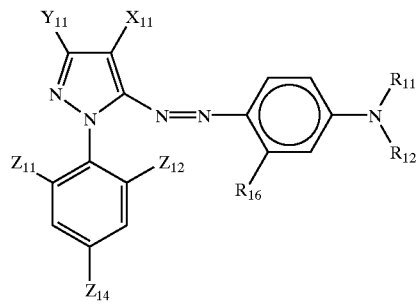

In the general formula (14), $X_{11}$, $Y_{11}$, $Z_{11}$, $Z_{12}$, $Z_{14}$, $R_{11}$, $R_{12}$ and $R_{16}$ have the same respective meanings as $X_{11}$, $Y_{11}$, $Z_{11}$, $Z_{12}$, $Z_{14}$, $R_{11}$, $R_{12}$ and $R_{16}$ in the general formula (12). The same applies to preferable examples of $X_{11}$, $Y_{11}$, $Z_{11}$, $Z_{12}$, $Z_{14}$, $R_{11}$, $R_{12}$ and $R_{16}$.

In the azo dyes represented by the general formula (14) particularly preferable combinations of substituents are the same as the particularly preferable combinations of substituents in the general formula (12). However, it is essential that at least one of the substituents represents an ionic hydrophilic group or has an ionic hydrophilic group as a substituent.

A preferable combination of substituents of a compound represented by the general formula (14) is as follows. A compound in which at least one substituent among various substituents is one of the preferable group described above is preferable, a compound in which more substituents thereof are the preferable groups described above is more preferable, and a compound in which all the substituents are the preferable groups described above is most preferable.

Specific examples (indicated as exemplary compounds 101 to 143) of the azo dyes represented by the general formulae (10) to (14) are given below. However, it should be noted that the azo dyes to be used in the present invention are not limited to these examples.

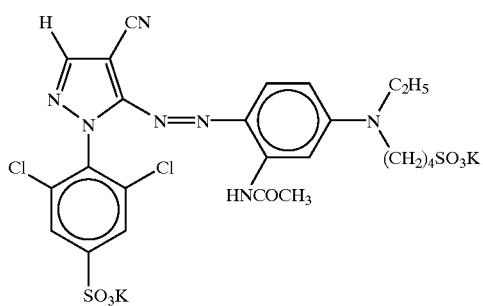
(101)
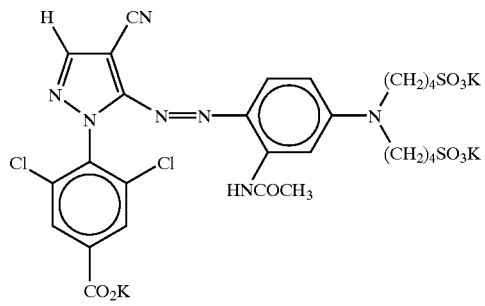
(106)
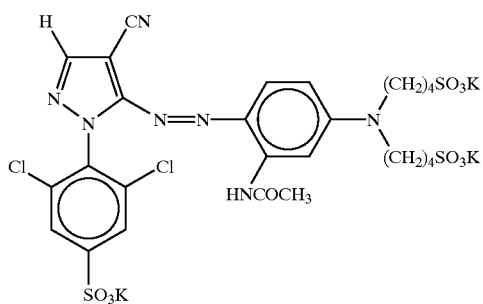
(102)
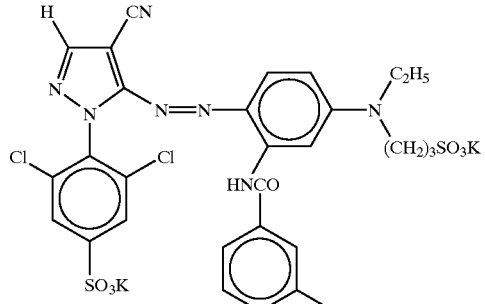
(107)
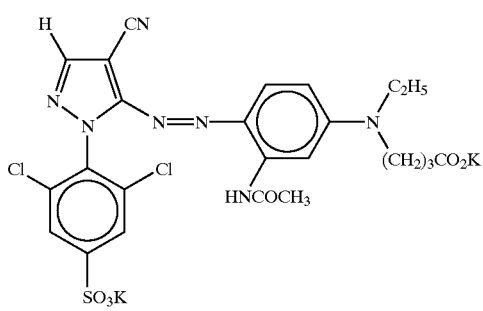
(103)
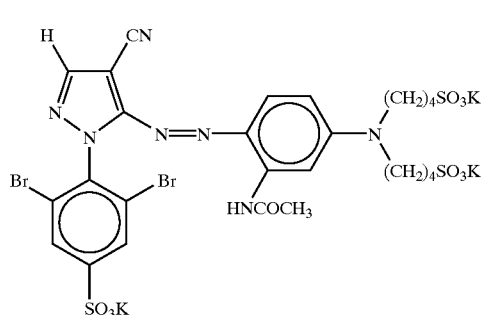
(108)
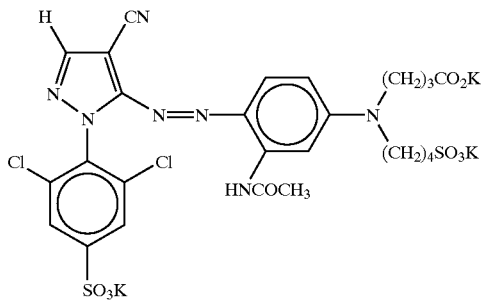
(104)
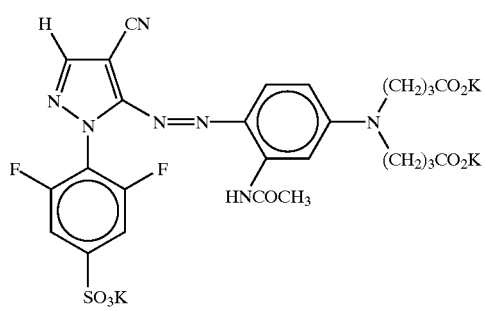
(109)
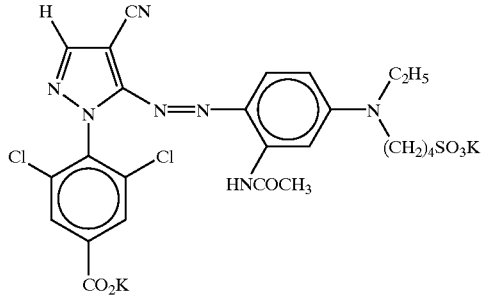
(105)
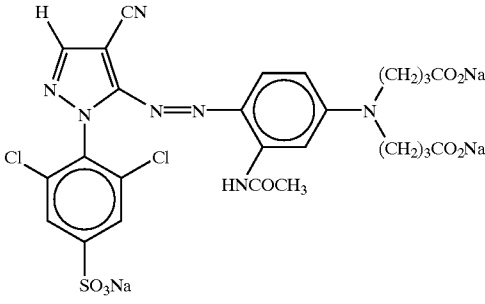
(110)

-continued
(111)
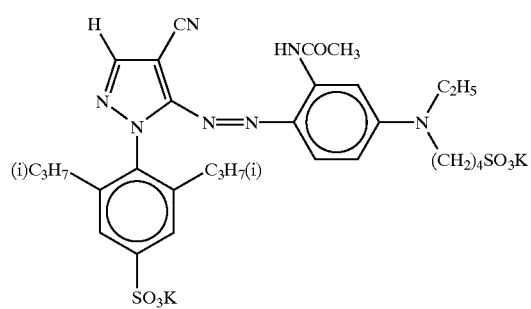
(112)
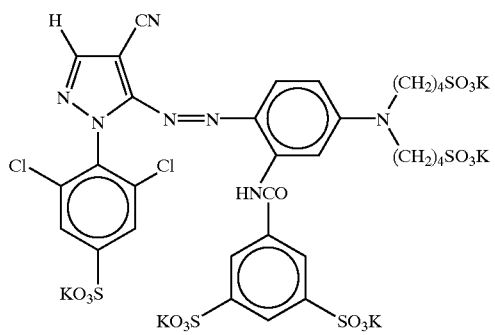
(113)
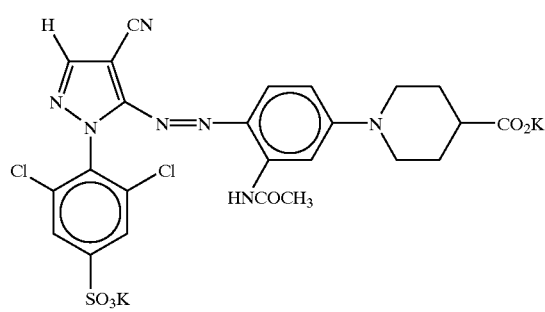
(114)
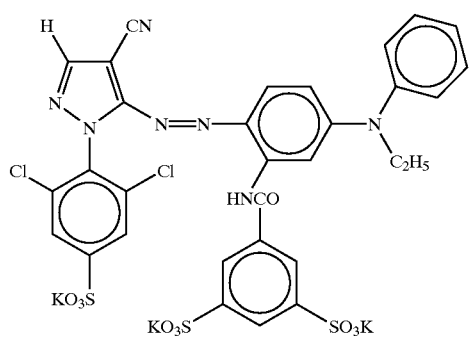
(115)
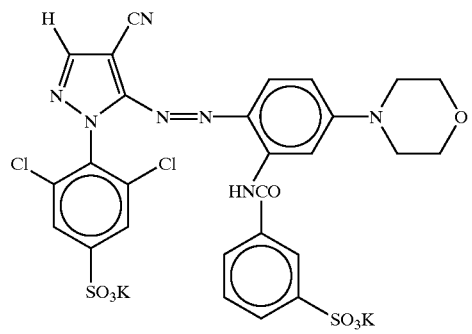
-continued
(116)
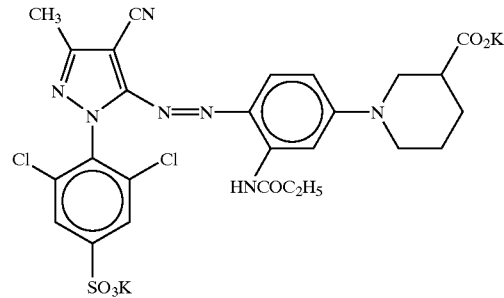
(117)
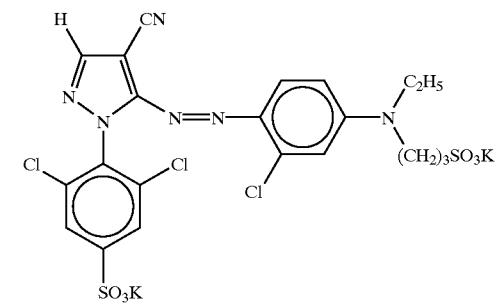
(118)
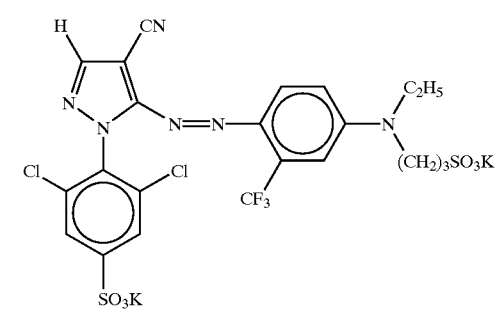
(119)
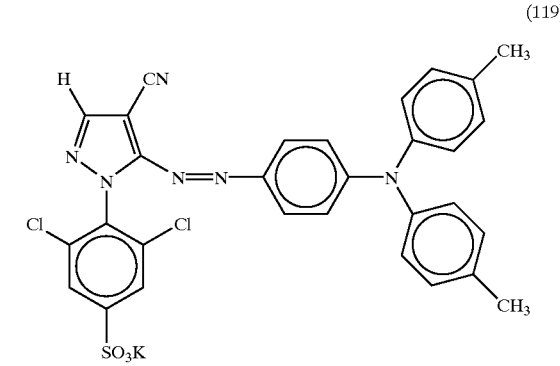
(120)
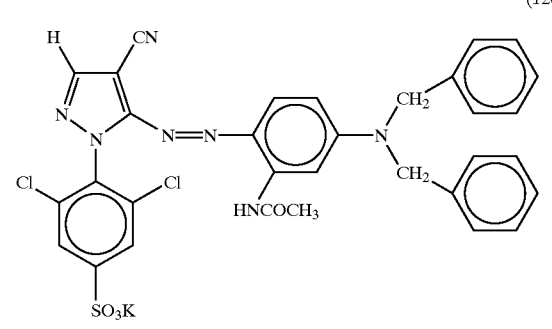

(121) 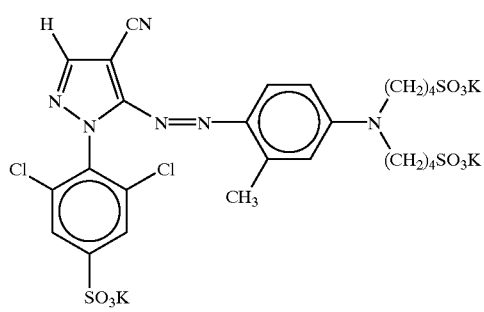
(122) 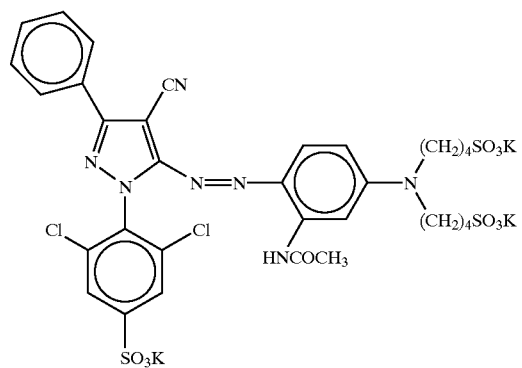
(123) 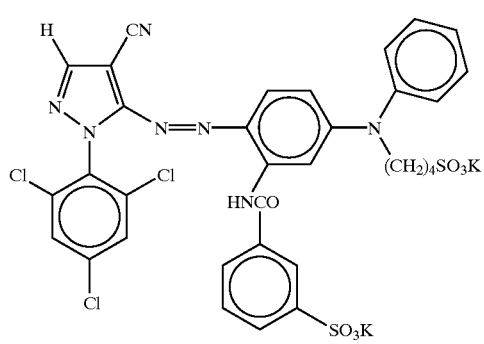
(124) 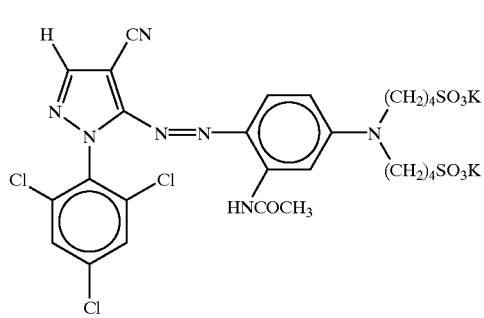
(125) 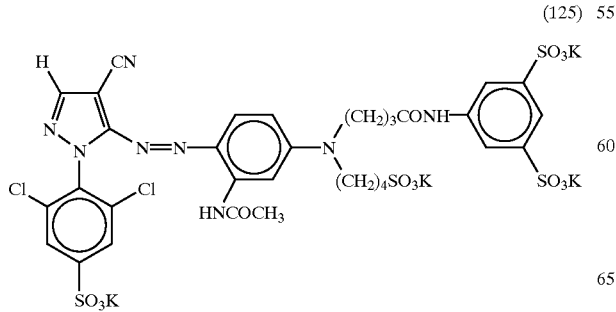
(126) 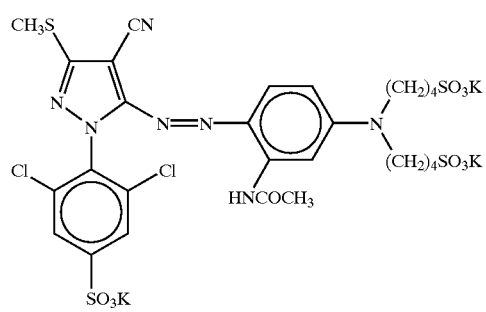
(127) 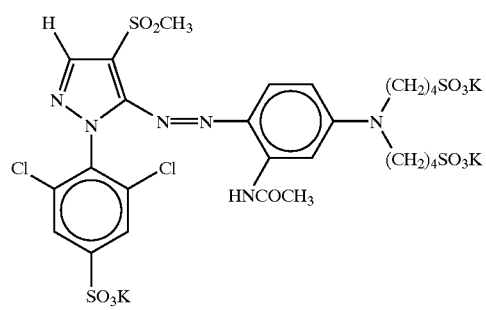
(128) 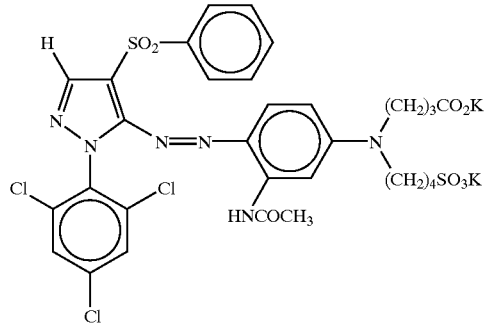
(129) 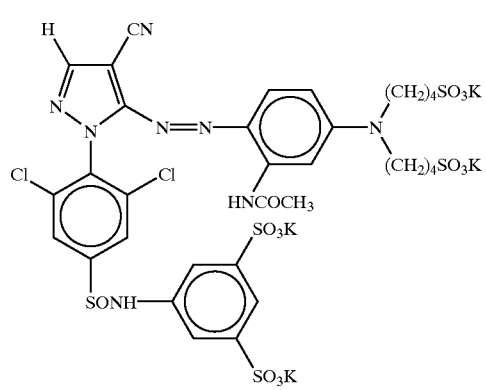

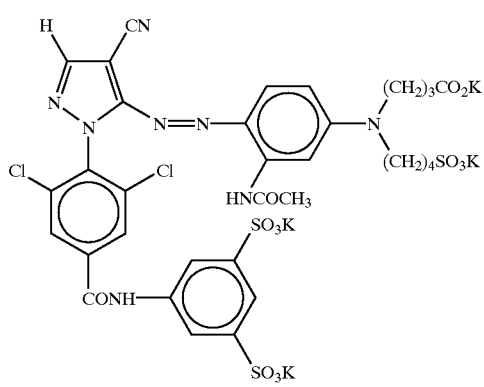
(130)
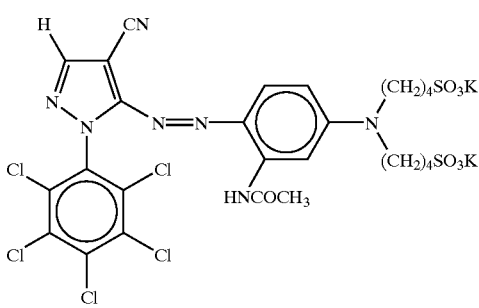
(135)
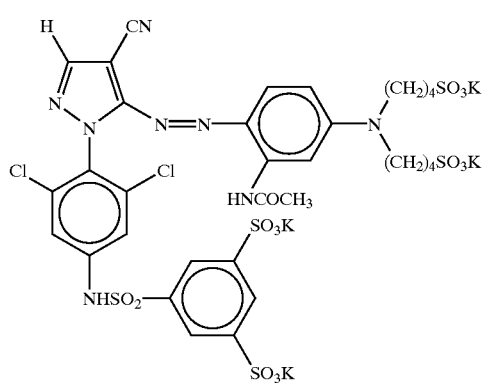
(131)
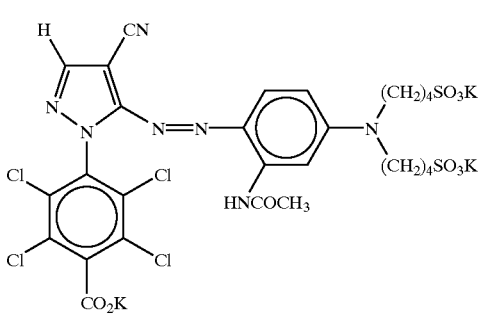
(136)
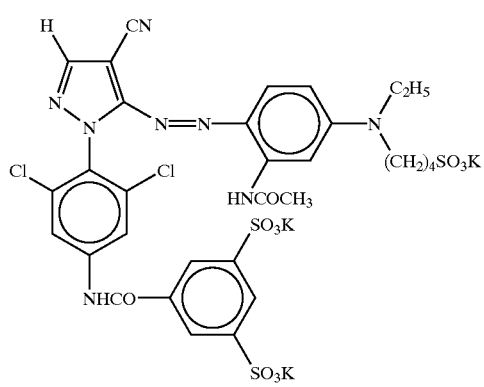
(132)
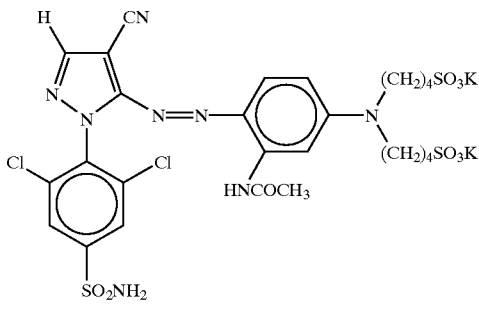
(137)
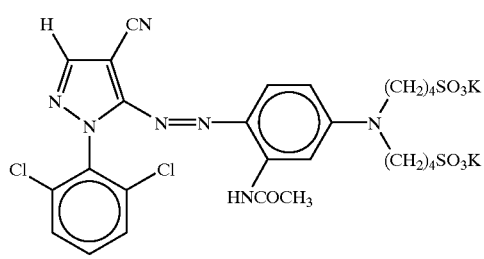
(133)
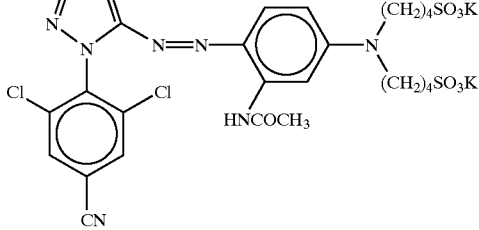
(138)
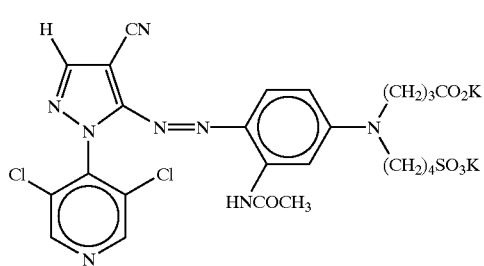
(134)
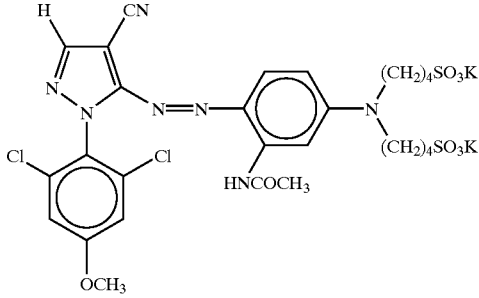
(139)

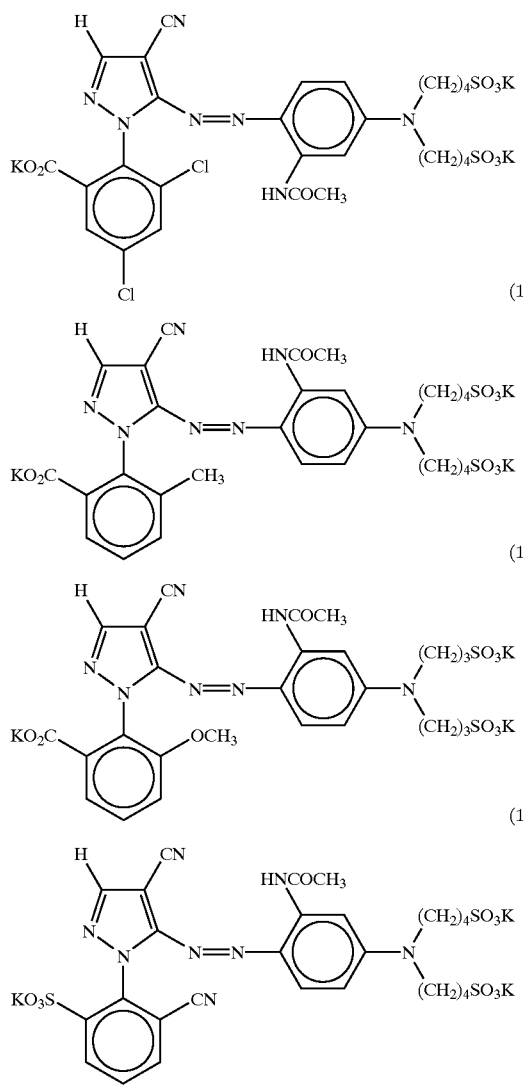

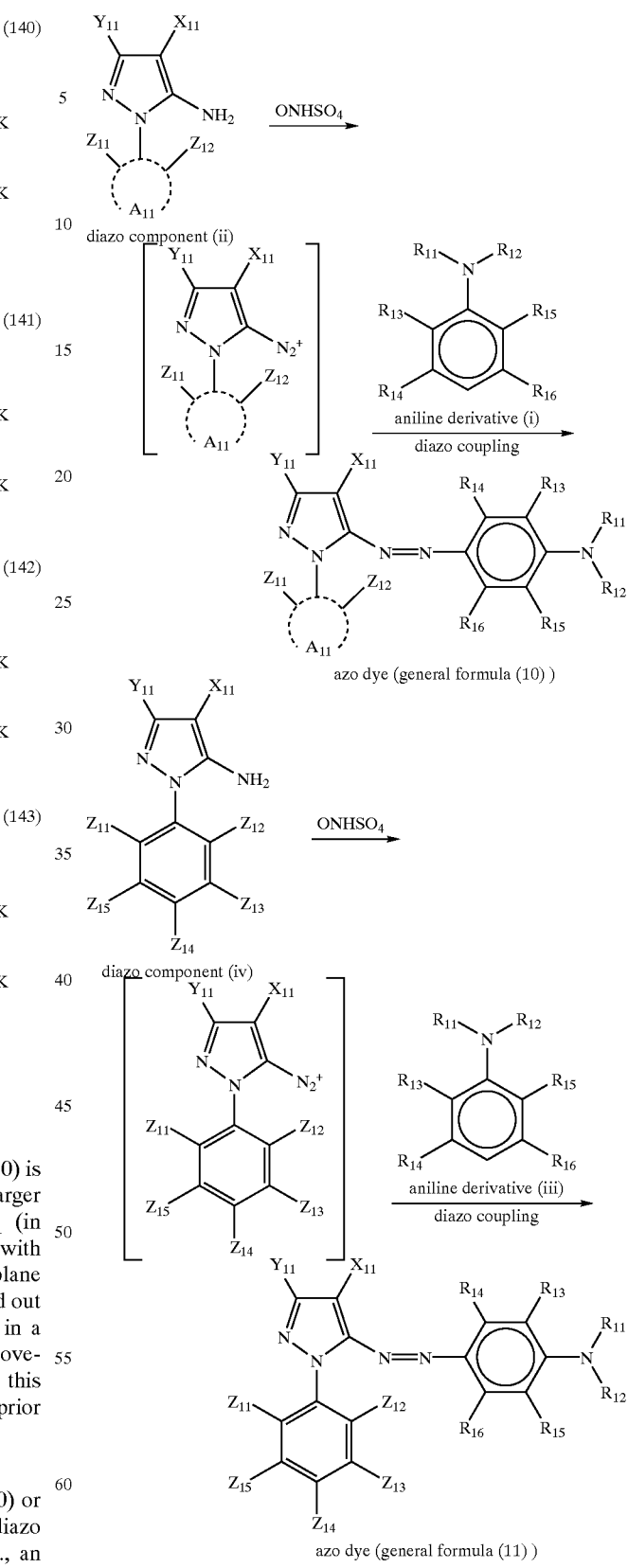

The compound represented by the general formula (10) is characterized in that substituents $Z_{11}$ and $Z_{12}$, each larger than a hydrogen atom, are present on the ring $A_{11}$ (in particular, on the atom adjacent to the atom substituted with the N atom of the pyrazole ring). Because of this, the plane of the pyrazole and the plane of the ring $A_{11}$ are twisted out of the same plane. This structure is thought to result in a marked improvement of hue and lightfastness. The improvement of the hue and lightfastness brought about by this characteristic structure cannot be anticipated from the prior art described previously.

The azo dyes represented by the general formula (10) or the general formula (11) can be synthesized by a diazo coupling reaction between a coupling component, i.e., an aniline derivative represented by one of following general formulas (i) and (iii), and a diazo component, i.e., a heterocyclic amine (5-amino-pyrazole) represented by one of following general formulas (ii) and (iv).

In preparation of a diazonium salt of the heterocyclic amine derivative (5-amino-pyrazole), an organic solvent can be used as a reaction solvent (e.g., an aliphatic acid-based solvent such as acetic acid, propionic acid, or isobutyric acid; an alcoholic solvent such as methanol, ethanol, or isopropyl alcohol; an amide-based solvent such as N,N-dimethylacetamide, N,N-dimethylformamide, or 1-methyl-2-pyrrolidone; sulfolane-based solvent such as sulfolane; a sulfoxide-based solvent such as dimethyl sulfoxide; a ureido-based solvent such as tetramethylurea; a halide-based solvent such as dichloromethane, chloroform, or 1,2-dichloroethane; an ester-based solvent such as ethyl acetate and butyl acetate; or an ether-based solvent such as diethyl ether or tetrahydrofuran). These organic solvents can be used singly or as a mixture of two or more. Further, a mixture of an organic solvent and water can be used. Furthermore, water as a single solvent can be used, of these solvents, an aliphatic acid-based solvent, an ester-based solvent, or an ether-based solvent are preferable. Mixtures of these solvents with alcoholic solvents or water are also preferable. The most preferable solvents are a single organic solvent, i.e., an aliphatic acid-based solvent or an ester-based solvent, a mixture of the same with water, or water as a single solvent.

Examples of the acid that can be used include hydrochloric acid, nitric acid, sulfuric acid, methanesulfonic acid, trifluoromethanesulfonic acid, heptadecafluorooctanesulfonic acid, acetic acid, trifluoroacetic acid, propionic acid, and mixtures of these acids. Among these acids, sulfuric acid, trifluoromethanesulfonic acid, and heptadecafluorooctane sulfonic acid are preferable. Sulfuric acid and heptadecafluorooctanesulfonic acid are particularly preferable.

Examples of the diazotizing agent that can be used include sodium nitrite, an aqueous sodium nitrite solution, potassium nitrite, an aqueous potassium nitrite solution, isoamyl nitrite, and nitrosyl sulfate (a sulfuric acid solution). Among these diazotizing agents, the aqueous sodium nitrite solution, isoamyl nitrite, and nitrosyl sulfuric acid (a sulfuric acid solution) are preferable. The use of isoamyl nitrite or nitrosyl sulfuric acid (sulfuric acid solution) as the diazotizing agent is particularly preferable.

The reaction temperature is within the range of −78 to 50° C., preferably within the range of −20 to 20° C., and most preferably within the range of −20 to 10° C.

Examples of a solvent that can be used as a reaction solvent in a diazo coupling reaction (i.e., conversion into an azo dye) include organic solvents such as an aliphatic acid-based solvent such as acetic acid, propionic acid, or isobutyric acid; an alcoholic solvent such as methanol, ethanol, or isopropyl alcohol; an amide-based solvent such as N,N-dimethylacetamide, N,N-dimethylformamide, or 1-methyl-2-pyrolidone; a sulfolane-based solvent such as sulfolane; a sulfoxide-based solvent such as dimethyl sulfoxide; a ureido-based solvent such as tetramethylurea; a halide-based solvent such as dichloromethane, chloroform, or 1,2-dichloroethane; an ester-based solvent such as ethyl acetate or butyl acetate; an ether-based solvent such as diethyl ether or tetrahydrofuran, and a pyridine-based solvent such as pyridine, α-picoline, or 2,6-lutidine. These organic solvents can be used singly or as a mixture of two or more. Further, a mixture of an organic solvent and water can be used. Furthermore, water as a single solvent can be used. Of these solvents, an aliphatic acid-based solvent, an amide-based solvent, an ester-based solvent, and an ether-based solvent are preferable. Mixtures of these solvents with alcoholic solvents or water are also preferable. The most preferable solvents are a single organic solvent, i.e., an aliphatic acid-based solvent or an amide-based solvent, or a mixture of the same with an alcoholic solvent or water.

Examples of the base that can be used include organic bases (e.g., an aliphatic amine such as a triethylamine aqueous solution, triethylamine, tripropylamine, diisopropylethylamine, triethanolamine, or diethanolethylamine; an aromatic amine such as N,N-dimethylaniline or N,N-diethylaniline; or a nitrogen-containing unsaturated heterocycle such as pyridine, α-picoline, 2,6-lutidine, pyridazine, or N-imidazole) and inorganic bases (e.g., an acetate such as potassium acetate or sodium acetate; a carbonate such as potassium carbonate, sodium carbonate, sodium hydrogencarbonate, or potassium hydrogencarbonate; or a metal hydroxide such as sodium hydroxide or potassium hydroxide). Of these bases, aliphatic amines, nitrogen-containing unsaturated heterocycles, and acetates are preferable. The most preferable bases are aliphatic amines and acetates.

The reaction temperature is within the range of −78 to 50° C., preferably within the range of −20 to 20° C., and most preferably within the range of −20 to 15° C.

The product obtained by these reactions is post-treated according to ordinary methods employed in organic synthesis and is used after being purified or without being purified. That is, the reaction product which comprise materials liberated from the reaction system may be used without purification. Otherwise, the reaction product which comprise materials liberated from the reaction system may be subjected to a single operation or a combination of operations such as recrystallization, column chromatography, and the like. Alternatively, after completion of the reactions, the reaction product, after removal of the reaction solvent by distillation or without removal of the reaction solvent, is poured into water or ice water. After that, the reaction product which comprise materials liberated from the reaction system, after being neutralized or without being neutralized, may be used without purification or subjected to a single operation or a combination of operations comprising such as recrystallization, column chromatography, and the like. Further alternatively, after the completion of the reactions, the reaction product, after removal of the reaction solvent by distillation or without removal of the reaction solvent, is poured into water or ice water. After that, the resulting mixture, after being neutralized or without being neutralized, may be extracted with an organic solvent. This extract may be used without being purified, or the extract maybe subjected to a single operation or a combination of operations such as crystallization, column chromatography, and the like.

Specific examples of the synthesis of the pyrazolylaniline azo dye derivatives of the present invention are given below. In the preparation of the azo dye derivatives of the present invention, the synthesis intermediates, namely, a compound (C) which is a heterocyclic amine derivative and compounds (E) and (F) which are aniline derivatives, were synthesized according to the following synthesis routes as intermediates of exemplary compounds. Subsequently, the exemplary compounds (101) and (103) were synthesized according to the diazo coupling reaction described above.

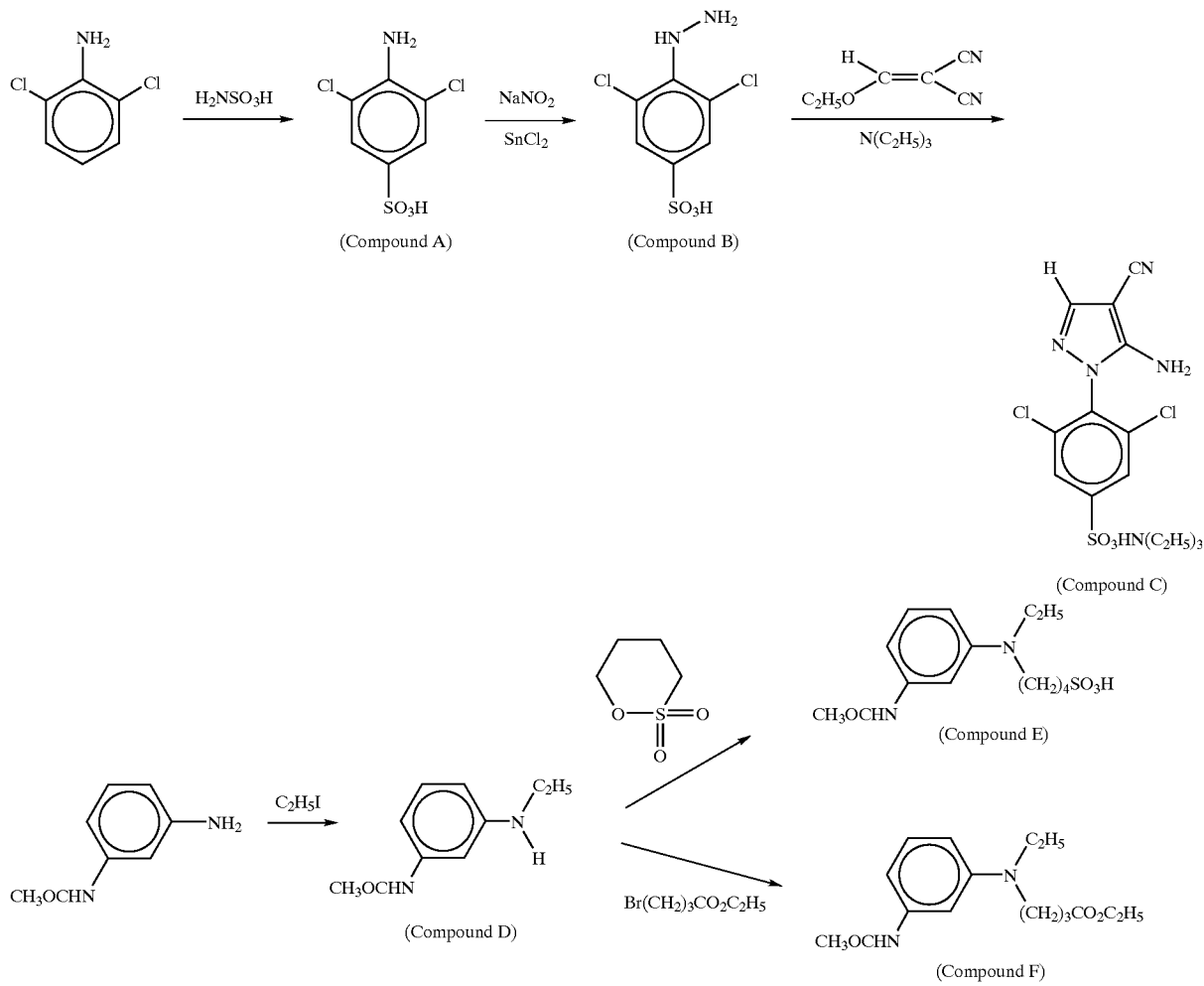

(Compound A)

(Compound B)

(Compound C)

(Compound D)

(Compound E)

(Compound F)

SYNTHESIS EXAMPLE 1

Synthesis of the Exemplary Compound (101))
Synthesis of Compound (A)

A reaction vessel containing a solution composed of 81.0 g (0.5 mol) of 2,6-di-chloroaniline dissolved in 400 mL of sulfolane was charged with 53.4 g (0.55 mol) of amidosulfuric acid in aliquots at 50° C. The temperature of this reaction liquid was raised to 140° C. and the reaction liquid was stirred at that temperature for 60 minutes (the reaction liquid in a suspension state was converted into a homogeneous solution). Next, the reaction liquid was cooled to 50° C. After that, 500 mL of ethyl acetate, which had been heated to 60° C., was added dropwise to the reaction liquid. After completion of the addition, the reaction liquid was gradually cooled to room temperature while being stirred. A deposited substance was collected by filtration and was then washed with cold ethyl acetate. After that, the substance was dried overnight at 40° C. In this way, 150 g of a crude product was obtained. The 150 g of the crude product was dissolved in 500 mL of water, and 125 mL of concentrated hydrochloric acid was added dropwise to this aqueous solution while the solution was being cooled with ice. The resulting mixture was stirred for 30 minutes at a temperature of 10° C. or below. A deposited substance was collected by filtration and was then washed with dilute hydrochloric acid. After that, the substance was dried overnight at 40° C. In this way, 99 g of the compound (A) was obtained (melting point: 270 to 275° C.).

Synthesis of Compound (B)

To a solution composed of 99 g (0.41 mol) of the compound (A) dissolved in 300 mL of water and kept at 10° C. or below was gradually added dropwise 102 mL of concentrated hydrochloric acid. Subsequently, a solution composed of 31.1 g (0.45 mol) of sodium nitrite dissolved in 100 mL of water was added dropwise at 10° C. or below. This reaction liquid (diazonium solution) was stirred for 60 minutes at 10° C. or below. Next, the reaction liquid was gradually added dropwise to a solution composed of 310 g (1.64 mol) of stannous chloride dissolved in 600 mL of concentrated hydrochloric acid which had been cooled to 5° C. or below. The resulting reaction mixture was stirred for 90 minutes at 10° C. A deposited substance was collected by filtration. Crude crystals thus obtained were taken out and washed with 800 mL of cold acetonitrile. The crude crystals, after being washed with cold acetonitrile, were dried overnight at 40° C. In this way, 75.0 g of the compound (B) was obtained (melting point: 300° C. or above).

Synthesis of the Compound (C)

To a solution composed of 70 g (0.27 mol) of the compound (B) and 38 mL (0.27 mol) of triethylamine dissolved in 300 mL of ethanol, which was being stirred, was added 36.6 g (0.3 mol) of ethoxymethylenemalononitrile in aliquots at room temperature. The temperature of this reaction liquid was raised and the reaction liquid was stirred at a refluxing temperature for 60 minutes (the reaction liquid in a suspension state was converted into a homogeneous solution) Next, the reaction liquid was gradually cooled to 5° C. After that, the deposited substance was collected by filtration and was then washed with cold isopropanol. The substance was dried overnight at 50° C. In this way, 107.4 g of the compound (C) was obtained (melting point: 233 to 234° C.).

Synthesis of Compound (D)

To a solution composed of 150.2 g (1 mol) of m-aminoacetanilide dissolved in 450 mL of N,N-dimethylacetamide, which was being stirred at 30° C., was added 143 g (1.1 mol) of potassium carbonate in aliquots. After the temperature of the reaction liquid was raised to 60° C., 96 mL (1.2 mol) of ethyl iodide was added dropwise. The reaction liquid was then stirred for 180 minutes at a refluxing temperature and gradually cooled to 20° C. The reaction liquid, in a suspension state, was filtered and a deposited substance was washed with ethyl acetate. This filtrate was subjected to separatory extraction with ethyl acetate and warm water. The organic layer was washed with a saturated sodium chloride aqueous solution. After that, the organic layer was dried using magnesium sulfate. The ethyl acetate was removed by distillation under a reduced pressure and an oily substance obtained as a residue was subjected to recrystallization from n-hexane. In this way, 126.5 g of the compound (D) was obtained (melting point: 64 to 65° C.).

Synthesis of the Compound (E)

While being stirred, 89.1 g (0.5 mol) of the compound D was heated to 50° C., and 74.9 mL (0.55 mol) of 1,4-butanesultone was added thereto dropwise. The resulting reaction liquid was stirred for 10 minutes at 100° C. The reaction liquid was cooled to 60° C., and 300 mL of methanol, which had been was heated to 55° C., was added dropwise. The reaction liquid (i.e., a suspension) was stirred for 1 hour at 60° C. and, while still being stirred, the reaction liquid was gradually cooled to room temperature. After that, a deposited substance was collected by filtration and was then washed with cold methanol. The substance was dried overnight at 40° C. In this way, 132 g of the compound (E) was obtained (melting point: 232 to 233° C.).

Synthesis of the Exemplary Compound (101)

10 mL of concentrated sulfuric acid was added to 1.6 g of a 40% by weight solution of nitrosylsulfuric acid that was being stirred at 10° C. or below. To this reaction liquid, which was kept at 10° C. or below, was gradually added dropwise a solution prepared by dissolving 2.17 g of the compound (C) in 15 mL of acetic acid and 5 mL of propionic acid at room temperature. While being kept at 10° C. or below, the resulting reaction liquid was stirred until it became a homogeneous solution. Next, this solution (i.e., a diazonium salt) was gradually added dropwise to a solution composed of 1.57 g of the compound (E) and 40 mL of a-picoline dissolved in 100 mL of N,N-dimethylacetamide while the N,N-dimethylacetamide solution was kept at 5° C. or below. The resulting reaction liquid was stirred for 30 minutes at 10° C., 500 mL of ethyl acetate was injected into the reaction liquid, and the stirring was continued for 30 minutes. After the stirring was stopped, the liquid separated into an ethyl acetate layer and a tarry substance. The ethyl acetate layer was collected and ethyl acetate was removed by distillation under a reduced pressure. An oily substance thus obtained was dissolved in water and thereafter was purified by gel permeation chromatography (SEPHADEX™ LH-20 manufactured by Pharmacia Inc.). The fraction obtained was collected, and water was removed by distillation under a reduced pressure. After that, 1.1 g of crystals of the exemplary compound (101) was obtained from a solution comprising ethanol and potassium acetate. (in DMF solution: $\lambda_{max}$=548.9 nm; $\epsilon_{max}$=4.83×10$^4$).

SYNTHESIS EXAMPLE 2

Synthesis of the Exemplary Compound 103
Synthesis of the Compound (F)

To a solution composed of 35.6 g (0.2 mol) of the compound (D) dissolved in 100 mL of N,N-dimethylacetamide, which was being stirred at 30° C., was added 30.4 g (0.22 mol) of potassium carbonate in aliquots. The temperature of the reaction liquid was raised to 50° C., and 42.9 g (0.22 mol) of ethyl 4-bromo(n)butyrate was added dropwise. This reaction liquid was then stirred for 90 minutes at 85° C. and gradually cooled to 20° C. The reaction liquid in a suspension state was filtered and a deposited substance was washed with ethyl acetate. This filtrate was subjected to separatory extraction with ethyl acetate and warm water. The resulting organic layer was washed with a saturated sodium chloride aqueous solution. After that, the organic layer was dried using magnesium sulfate. The ethyl acetate was removed by distillation under a reduced pressure, and 60 g of a crude oily substance was obtained. The crude oily substance was subjected to purification by column chromatography (n-hexane/ethyl acetate) using silica gel (WAKOGEL C-300HG manufactured by Wako Pure Chemical Industries, Ltd.). As a result, 51.5 g of the oily compound (F) was obtained. Synthesis of the exemplary compound (103)

10 mL of concentrated sulfuric acid was added dropwise to 1.6 g of a 40% by weight solution of nitrosylsulfuric acid that was being stirred at 10° C. or below. To this reaction liquid, which was kept at 10° C. or below, was gradually added dropwise a solution prepared by dissolving 2.17 g of the compound (C) in 15 mL of acetic acid and 5 mL of propionic acid at room temperature. While being kept at 10° C. or below, the resulting reaction liquid was stirred until it became a homogeneous solution. Next, this solution (i.e., a diazonium salt) was gradually added dropwise to a solution composed of 1.46 g of the compound (F) and 40 mL of a-picoline dissolved in 100 mL of N,N-dimethylacetamide, while the N,N-dimethylacetamide solution was kept at 5° C. or below. The resulting reaction liquid was stirred for 30 minutes at 10° C., 500 mL of ethyl acetate was injected into the reaction liquid, and the stirring was continued for 30 minutes. After the stirring was stopped, the reaction liquid was subjected to separatory extraction with ethyl acetate and warm water. The resulting organic layer was washed with a saturated sodium chloride aqueous solution. After that, the organic layer was dried using magnesium sulfate. The ethyl acetate was removed by distillation under a reduced pressure and a crude oily substance was obtained. The crude oily substance was subjected to purification by column chromatography (methanol/methylene chloride) using silica gel (WAKOGEL C-300HG manufactured by Wako Pure Chemical Industries, Ltd.) As a result, a dye intermediate (i.e., an ethoxycarbonyl derivative of the exemplary compound 103) was obtained. Subsequently, to a solution composed of 1.0 g of the intermediate dissolved in 30 mL of methanol, which was being stirred, was added 1.0 g of potassium hydroxide. The temperature of this reaction liquid was then raised to 50° C. and stirred at that temperature for 60 minutes. After that, the reaction liquid was poured into a mixture of 5 mL of concentrated hydrochloric acid and 100 mL of cold water. The resulting mixture was subjected to separatory extraction with ethyl acetate and warm water. The resulting organic layer was washed with a saturated sodium chloride aqueous solution. The organic layer was dried using magnesium sulfate. Next, ethyl acetate was removed by distillation under a reduced pressure and a crude oily substance was obtained. After that, 0.9 g of crystals of the exemplary compound (103) was obtained from a solution comprising ethanol and potassium acetate. (in DMF solution: $\lambda_{max}$= 546.4 nm; $\epsilon_{max}$=4.50×10$^4$).

The azo dye of the present invention can be used in various image-recording materials, in particular in image-recording materials for the formation of color images. More specifically, the azo dye of the present invention can be used in ink-jet recording materials, heat-sensitive transfer-type image-recording materials, pressure-sensitive recording materials, electrophotographic image-recording materials, transfer-type silver halide photosensitive materials, printing inks, and recording pens. Among these applications, the azo dye of the present invention is more suitable for use in ink-jet recording materials, heat-sensitive transfer-type image-recording materials, and electrophotographic image-recording materials and particularly in ink-jet recording materials.

The ink-jet printing ink of the present invention can be prepared by dissolving and/or dispersing the azo dye in an aqueous medium. If necessary, additives such as a surfactant, a drying-preventing agent (a wetting agent), a stabilizer, an antiseptic, and the like can be added. When the azo dye is dispersed in the aqueous medium, it is preferable to disperse colored particles comprising the azo dye and an oil-soluble polymer in the aqueous medium, to disperse the azo dye dissolved in a high-boiling point organic solvent in the aqueous medium, or to disperse the azo dye in a solid state in the aqueous medium to thereby produce a dispersion of fine particles. At the time of dispersing, a dispersant or a surfactant can be used. Examples of dispersing equipment that can be used include a simple stirrer or impeller, an in-line mixer, a mill (e.g., a colloid mill, a ball mill, a sand mill, an attritor, a roller mill, or an agitator mill), an ultrasonic disperser, and a high-pressure emulsifying disperser (high-pressure homogenizer: GORING homogenizer, MICRO-FLUIDIZER, DEBEE 2000, etc. are commercially available machines). The details of methods of preparing the ink-jet printing ink are described in JP-A Nos. 5-148436, 5-295312, 7-97541, 7-82515, 7-118584, and 11-286637, and Japanese Patent Application No. 2000-87539. These methods can also be utilized in the preparation of the ink-jet printing ink of the present invention.

The aqueous medium described above can be a mixture composed of water as a main component and a water-miscible organic solvent as an optional component. Examples of the water-miscible organic solvent include alcohols (e.g., methanol, ethanol, propanol, iso-propanol, butanol, iso-butanol, sec-butanol, t-butanol, pentanol, hexanol, cyclohexanol, and benzylalcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine), and other polar solvents (e.g., formamide, N,N-dimethylformamide, N,N-dimethylacetamide, dimethyl sulfoxide, sulfolane, 2-pyrolidone, N-methyl-2-pyrolidone, N-vinyl-2-pyrolidone, N-oxazolidone, 1,3-dimethyl-2-imidazolidinone, acetonitrile, and acetone). These water-miscible organic solvents may be used in combinations of two or more.

It is preferable that the azo dye in an amount of 0.2 parts by weight or more and 10 parts by weight or less is incorporated in 100 parts by weight of the ink-jet printing ink of the present invention. The ink-jet printing ink of the present invention may contain other dyes together with the azo dye described above. In a case where two or more kinds of dyes are used, it is preferable that the total content of the dyes falls within the above-described range.

The viscosity of the ink-jet printing ink of the present invention is preferably 40 cp or less. The surface tension of the ink-jet printing ink of the present invention is preferably 20 dyn/cm or more and 100 dyn/cm or less. The viscosity and the surface tension can be controlled by the addition of additives such as a viscosity-controlling agent, a surface tension-controlling agent, a specific resistance-controlling agent, a film-controlling agent, an ultraviolet absorber, an antioxidant, a fading-preventing agent, a mildew-proofing agent, a corrosion inhibitor, a dispersant, and a surfactant.

The ink-jet printing ink of the present invention can be used not only for the formation of single-color images but also for the formation of full-color images. For the formation of full-color images, a magenta-colored ink, a cyan-colored ink, and a yellow-colored ink can be used. In addition, for adjustment of colors, a black-colored ink may also be used.

[Ink-Jet Recording Method]

The ink-jet recording method according to the present invention features ejecting liquid droplets of the ink onto an image-receiving material by supplying an energy to the ink-jet printing ink, so that an image is recorded on the image-receiving material. Examples of the image-receiving material include plain paper, coated paper, and plastic films. Coated paper is preferably used, because the use of coated paper enhances image quality and image preservability.

It is desirable to use recording paper that contains a polymeric mordant as the image-receiving material. Polymeric mordants are described in JP-A Nos. 48-28325, 54-74430, 54-124726, 55-22766, 55-142339, 60-23850, 60-23851, 60-23852, 60-23853, 60-57836, 60-60643, 60-118834, 60-122940, 60-122941, 60-122942, 60-235134, and 1-161236, and U.S. Pat. Nos. 2,484,430, 2,548,562, 3,148,061, 3,309,690, 4,115,124, 4,124,386, 4,193,800, 4,273,853, 4,282,305, and 4,450,224. An image-receiving material containing a polymeric mordant described in JP-A No. 1-161236, pp.212 to 215, is particularly preferable. The use of the polymeric mordant described in JP-A No. 1-161236 makes it possible to obtain images having excellent qualities and to improve the lightfastness of the images.

In the ink-jet recording method according to the present invention, an image-receiving material containing inorganic pigments can be used as the image-receiving material. Examples of the inorganic pigment include a silica pigment, an alumina pigment, a titanium dioxide pigment, a zinc oxide pigment, a zirconium oxide pigment, a micaceous iron oxide pigment, a white lead pigment, a lead oxide pigment, a cobalt oxide pigment, a strontium chromate pigment, a molybdenum pigment, a smectite pigment, a magnesium oxide pigment, a calcium oxide pigment, a calcium carbonate pigment, and a mullite pigment. These inorganic pigments may be used in combinations of two or more.

In the ink-jet recording method according to the present invention, it is preferable to use a hydrophilic layer containing a hydrophilic binder as an ink-receiving layer of an image receiving material. A highly water-absorbent polymer is preferably used as the hydrophilic binder. Examples of the hydrophilic binder include gelatin, gelatin derivatives, polyvinyl alcohol, polyvinyl alcohol derivatives, polyalkylene oxides, and polyalkylene oxide derivatives. A hydrophilic binder is described in JP-A No. 1-161236, pp. 215 to 222. It is preferable to add a film hardener to the ink-receiving layer such that the ink-receiving layer is hardened. As the film hardener, the material described in JP-A No. 1-161236, p. 222, can be used.

In the ink-jet recording method according to the present invention, it is preferable that the image-receiving material contains a matting agent. The matting agent is described in JP-A No. 1-161236, pp. 263 to 264. A surfactant may be added to a constituent layer(s) of the image-receiving material. The surfactant functions as a coating aid, a peelability-improving agent, a slidability-improving agent, or an antistatic agent. Surfactants are described in JP-A Nos. 62-173463 and 62-183457. An organofluoro compound may be used in place of the surfactant. The organofluoro compound is preferably a hydrophobic compound. Examples of the organofluoro compound include a fluorine-containing surfactant, an oily fluorine-containing compound (such as a fluorinated oil), and a solid fluorine-containing resin (such as a tetrafluoroethylene resin). Organofluoro compounds are described in JP-B No. 57-9053 (columns 8 to 17), and JP-A Nos. 61-20994 and 62-135826.

In the ink-jet recording method according to the present invention, a constituent layer(s) (including a back layer) of the image-receiving material may contain a polymer latex. The polymer latex is used for improvements of film physical properties such as dimension stabilization, curling prevention, adhesion prevention, and prevention of film cracking. Polymer latices are described in JP-A Nos. 62-245258, 62-131664, and 62-110066. Incorporation of a polymer latex having a low glass transition temperature (i.e., 40° C. or below) in the layer containing the mordant can prevent cracking of the layer and curling of the image receiving material. Also, incorporation of a polymer latex having a high glass transition temperature in the back layer can prevent cracking and curling of the image receiving material. A constituent layer(s) of the image-receiving material may contain a browning inhibitor. Examples of the browning inhibitor include an antioxidant, an ultraviolet absorber, and a metal complex. Browning inhibitors are described in JP-A No. 1-161236, pp. 225 to 247. The image-receiving material may contain a fluorescent brightener. The fluorescent brightener may also be incorporated in ink so that the fluorescent brightener can be supplied from elsewhere to the image-receiving material.

In the case where the image-receiving material includes a substrate and an ink-receiving layer, the substrate is particularly preferably a sheet of paper whose both sides are laminated with a polyolefin (e.g., polyethylene, polystyrene, polyethylene terephthalate, polybutene, or a copolymer thereof) or a plastic film. The incorporation of a white pigment (e.g., titanium oxide or zinc oxide) or a tinctorial dye (e.g., cobalt blue, ultramarine blue, or neodymium oxide) is preferable.

The ink-jet recording may be carried out by any of a continuous method and an on-demand method. A method of supplying energy to the ink is not particularly limited. The energy may be supplied by any of a bubble jet method, a thermal jet method, and a method using ultrasonic waves.

Ink-jet recording methods include a method of ejecting a large number of small volumes of so-called photo-ink having a low concentration, a method designed to improve image quality by using a plurality of inks, each having substantially the same hue but a different concentration, and a method using colorless transparent ink. The effects of the present invention are particularly remarkable in an ink-jet recording method designed for the formation of near-photographic images at a high printing speed by ejection of a large amount of ink having a low concentration.

EXAMPLES

The present invention will be further explained in detail by the following Examples. However, it should be noted that the present invention is not limited in any manner whatsoever by the following Examples.

Example 1

Synthesis of Azo Dye 1-1

(1) Synthesis of Dye (A-1)

A mixture composed of 8 g (48.7 mmol) of 5-amino-3-tert-butyl-4-cyanopyrazole (1), 15 mL of concentrated hydrochloric acid, and 50 mL of water was stirred at an internal temperature of 5° C. Then, 3.36 g (48.7 mmol) of sodium nitrite was added to the mixture in aliquots over a period of 10 minutes and the resulting reaction liquid was stirred for 10 minutes (mixture 1). Meanwhile, a three-neck flask was charged with 12.8 g (40.6 mmol) of a coupler component (2), 50 g of sodium acetate, 50 mL of acetic acid, and 50 mL of water, and the contents were stirred. This mixture was cooled and the internal temperature of the mixture was kept at 5° C. (mixture 2). Next, the mixture 1 was added to the mixture 2 in the three-neck flask over a period of 10 minutes and the resulting reaction liquid was stirred for 30 minutes after the addition. After that, 300 mL of a saturated sodium chloride aqueous solution was added and the dye (A-1) that deposited was separated by suction filtration. The amount of the dye (A-1) obtained was 17.7 g (85% yield).

(2) Synthesis of Dye (B-1)

16.5 g (52 mmol) of an arylating agent (3), 5.5 g of potassium carbonate, and 100 mL of N,N-dimethylacetamide (DMAC) were added to 20.5 g (40 mmol) of the obtained dye (A-1). The reaction liquid was stirred for 3 hours at 100° C. After completion of a reaction, the reaction liquid was cooled to room temperature. After that, 400 mL of a saturated sodium chloride aqueous solution was added and the dye (B-1) that deposited was separated by suction filtration. The resulting crude crystals were recrystallized from acetonitrile solvent. The amount of the dye (B-1) obtained was 22.4 g (80% yield)

Synthesis of dye (A-1)

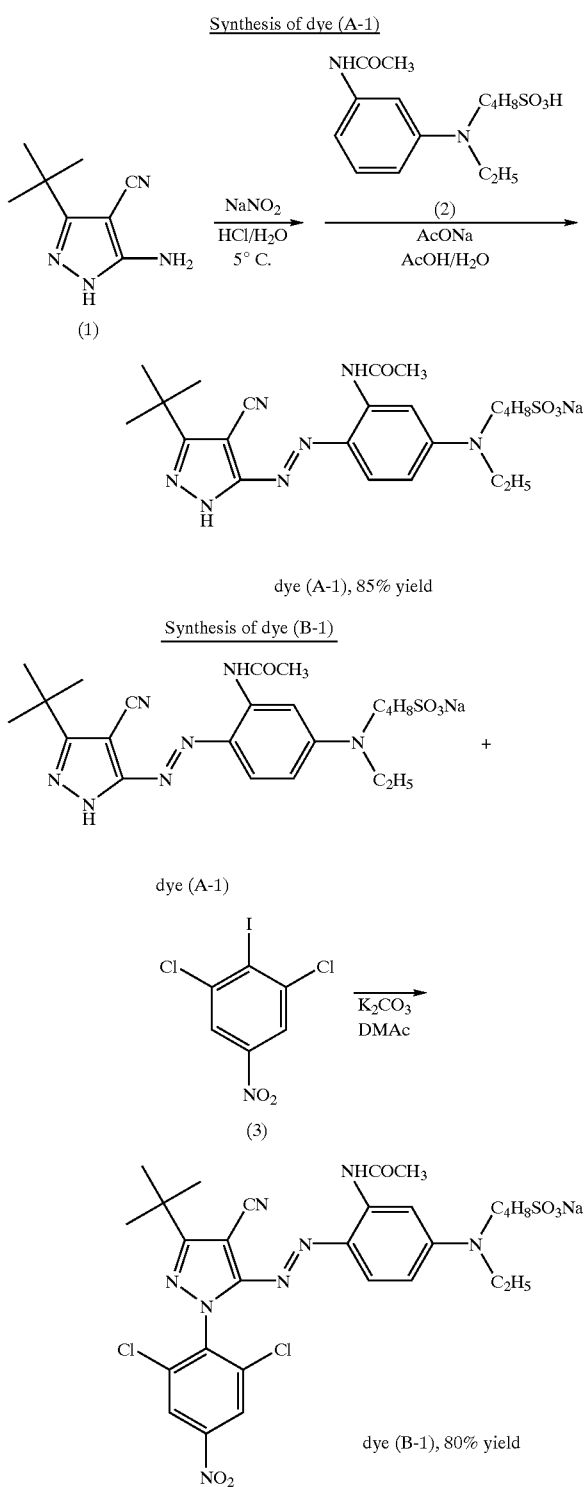

dye (A-1), 85% yield

Synthesis of dye (B-1)

dye (B-1), 80% yield (3) Synthesis of Dye (C-1)

560 mL of ethanol and 70 mL of water were added to 14 g (20 mmol) of the obtained dye (B-1). While this reaction liquid was stirred at room temperature, 2.8 g of sodium hydrogensulfide was added to the reaction liquid. The reaction liquid was heated and caused to react for 30 minutes under refluxing conditions. After completion of the reaction, ethanol was removed under a reduced pressure. A residue was subjected to acidification deposition by the addition of a 1N HCl aqueous solution. The dye (C-1) that deposited was separated by suction filtration. The amount of the dye (C-1) obtained was 12 g (93% yield).

(4) Synthesis of the Dye 1-1

50 mL of DMAc was added to 4.3 g (6.7 mmol) of the dye (C-1) While this reaction liquid was stirred at an internal temperature of 5° C., 1.76 g (7.35 mmol) of an acid halide (4) was gradually added to the reaction liquid. After the reaction liquid was stirred for 30 minutes, 4.5 mL of a saturated sodium hydrogencarbonate aqueous solution was added to the reaction liquid and the resulting mixture was stirred for a further 30 minutes. After that, 300 mL of a saturated sodium chloride aqueous solution was added and crystals that deposited were collected by filtration. These crude crystals were subjected to a desalting treatment and thereafter recrystallized from methanol to thereby obtain the dye 1-1. The amount obtained of the dye 1-1 was 5.3 g (90% yield).

The melting point of the obtained dye 1-1 was 300° C. or above; the maximum absorption wavelength $\lambda_{max}$ was 548.9 nm (in DMF solution); and m/z(NEGA) was 831.

Synthesis of dye (C-1)

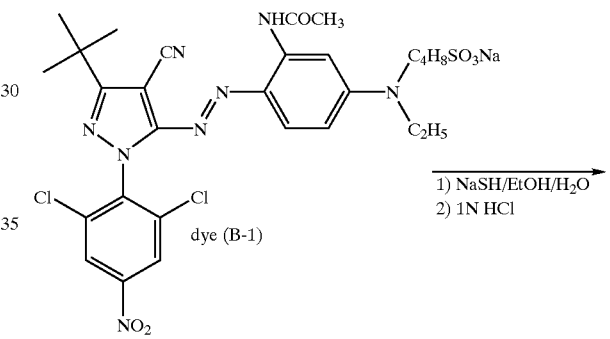

dye (C-1), 93% yield

Synthesis of dye 1-1

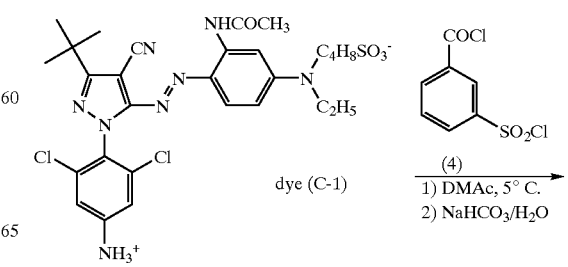

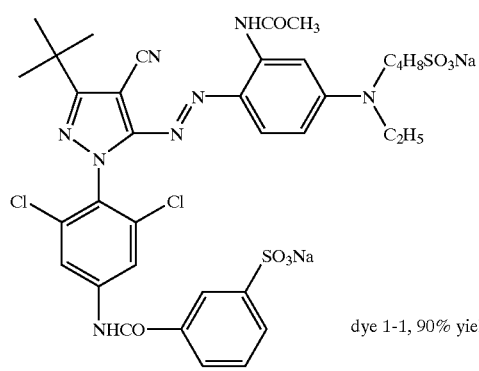

dye 1-1, 90% yield

Example 2

Synthesis of Azo Dye 1-6

(1) Synthesis of Dye (A-2)

A mixture composed of 8 g (48.7 mmol) of 5-amino-3-tert-butyl-4-cyanopyrazole (1), 15 mL of concentrated hydrochloric acid, and 50 mL of water was stirred at an internal temperature of 5° C. Then, 3.36 g (48.7 mmol) of sodium nitrite was added to the mixture in aliquots over a period of 10 minutes and the resulting reaction liquid was stirred for 10 minutes (mixture 3). Meanwhile, a three-neck flask was charged with 11.4 g (40.6 mmol) of a coupler component (2), 50 g of sodium acetate, 50 mL of acetic acid, and 50 mL of water, and the contents were stirred. This mixture was cooled and the internal temperature of the mixture was kept at 5° C. (mixture 4). Next, the mixture 3 was added to the mixture 4 in the three-neck flask over a period of 10 minutes and the resulting reaction liquid was stirred for 30 minutes after the addition. After that, the dye (A-2) that deposited was separated by suction filtration. The amount of the dye (A-2) obtained was 16.5 g (83% yield).

(2) Synthesis of Dye (B-2)

16.5 g (52 mmol) of an arylating agent (3), 5.5 g of potassium carbonate, and 100 mL of DMAc were added to 16.4 g (40 mmol) of the obtained dye (A-2). The reaction liquid was stirred for 3 hours at 100° C. After completion of a reaction, the reaction liquid was cooled to room temperature. After that, 400 mL of water was added and the dye (B-2) that deposited was separated by suction filtration. The resulting crude crystals were recrystallized from acetonitrile solvent. The amount obtained of the dye (B-2) was 20.5 g (85.4% yield)

Synthesis of dye (A-2)

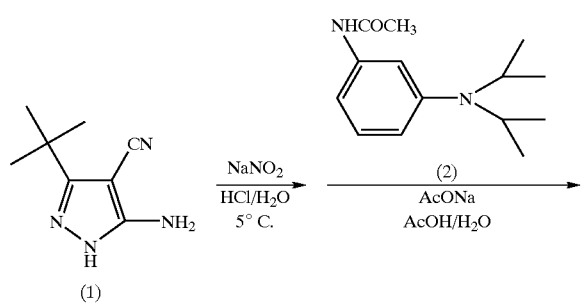

Synthesis of dye (B-2)

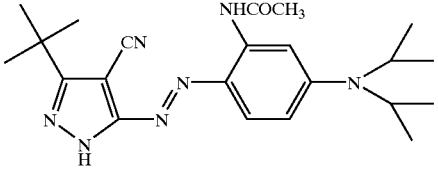

dye (A-2), 83% yield dye (A-2)

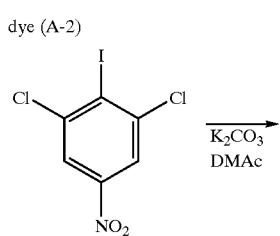

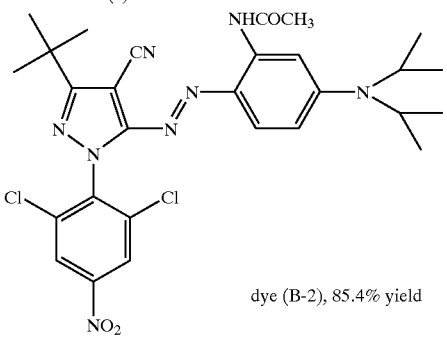

dye (B-2), 85.4% yield (3) Synthesis of the Dye (C-2)

560 mL of ethanol and 70 mL of water were added to 12 g (20 mmol) of the obtained dye (B-2). While this reaction liquid was stirred at room temperature, 2.8 g of sodium hydrogensulfide was added to the reaction liquid. The reaction liquid was heated and caused to react for 30 minutes under refluxing conditions. After completion of the reaction, about half of the ethanol was removed under a reduced pressure. A residue was subjected to acidification deposition by the addition of a 1N HCl aqueous solution. The dye (C-2) that deposited was separated by suction filtration. The amount of the dye (C-2) obtained was 11.5 g (95% yield).

(4) Synthesis of Dye 1-6

50 mL of DMAc was added to 4.0 g (6.7 mmol) of the dye (C-2). While this reaction liquid was stirred at an internal temperature of 5° C., 1.2 g (7.35 mmol) of an acid halide (4) was gradually added to the reaction liquid. After the reaction liquid was stirred for 30 minutes, 300 mL of water was added and crystals that deposited were collected by filtration. This crude crystals were purified by silica column chromatography to thereby obtain the dye 1-6. The amount of the dye 1-6 obtained was 5.3 g (90% yield).

The maximum absorption wavelength $\lambda_{max}$ of the obtained dye 1-6 was 549.5 nm (in DMF solution); and m/z (POSI) was 696.

Synthesis of dye (C-2)

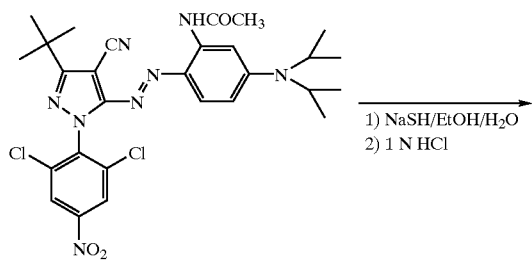

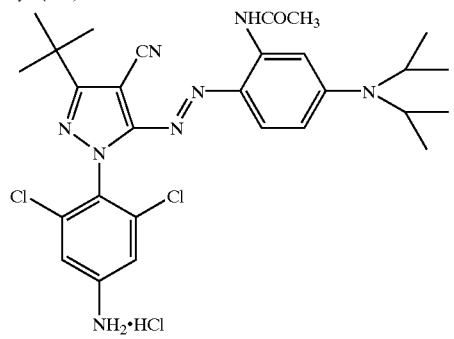

dye (C-2) in 95% yield

Synthesis of the dye 1-6

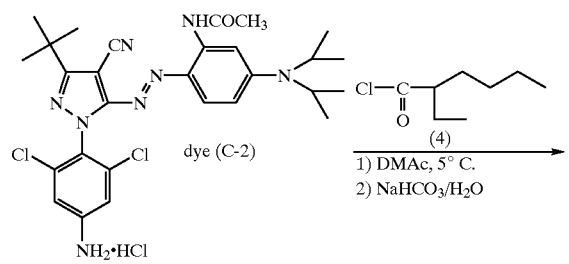

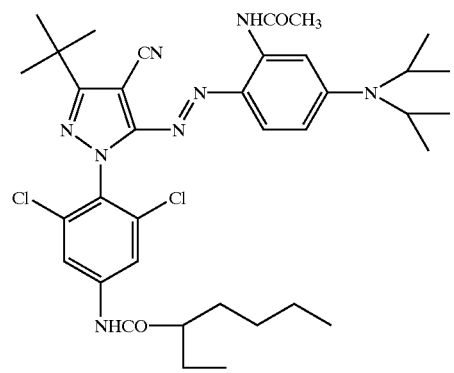

dye 1-6 in 90% yield

Example 3

Synthesis of Azo Dye 1-15

1 g (2.62 mmol) of the dye (A-3) and 930 mg (7.86 mmol) of sulfolene were dissolved in 50 mL of DMAC. This solution was caused to react for 3 hours at 100° C. The reaction liquid was cooled, 300 mL of water was added, and a product that deposited was separated by filtration under reduced pressure. The crude crystals obtained were purified by silica gel column chromatography to thereby obtain the dye 1-15. The amount obtained of the dye 1-15 was 1.2 g (68.6% yield).

The maximum absorption wavelength $\lambda_{max}$ of the obtained dye 1-15 was 538.8 nm (in ethyl acetate solution); and m/z(POSI) was 682.

Example 4

Synthesis of Azo Dye 1-17

1 g (2.62 mmol) of the dye (A-3) and 666 mg (3.93 mmol) of a heterylating agent (5) were dissolved in 50 mL of DMAc. The solution was caused to react for 1 hour at 100° C. The reaction liquid was cooled, 300 mL of water was added, and a product that deposited was separated by filtration under reduced pressure. The crude crystals obtained were purified by silica gel column chromatography to thereby obtain the dye 1-17. The amount obtained of the dye 1-17 was 1.5 g (83.8% yield).

The maximum absorption wavelength $\lambda_{max}$ of the obtained dye 1-17 was 551.4 nm (in ethyl acetate solution); and m/z (POSI) was 683.

Synthesis of dye 1-15

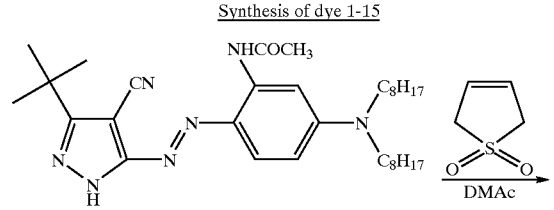

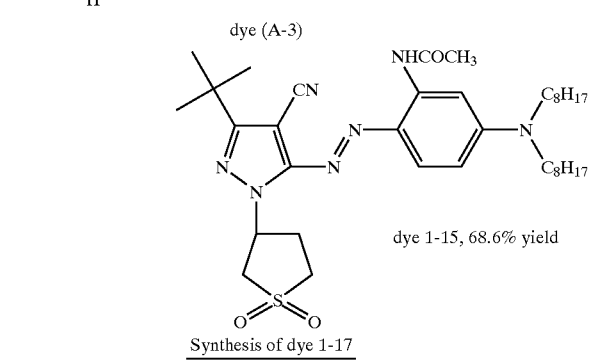

dye 1-15, 68.6% yield

Synthesis of dye 1-17

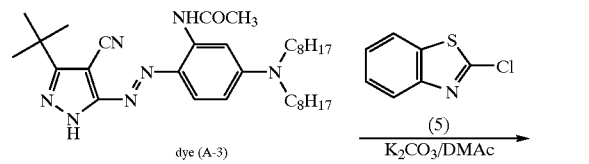

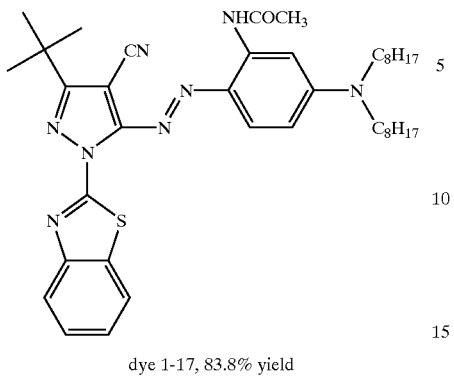

dye 1-17, 83.8% yield

Example 5

Synthesis of Azo Dye 1-23

1.45 g (2.62 mmol) of the dye (A-4) and 582 mg (3.93 mmol) of a heterylating agent (6) were dissolved in 50 mL of DMAC. The solution was caused to react for 1 hour at 100° C. The reaction liquid was cooled, 300 mL of water was added and a product that deposited was separated by filtration under reduced pressure. The crude crystals obtained were purified by silica gel column chromatography to thereby obtain the dye 1-23. The amount obtained of the dye 1-23 was 1.4 g (80.4% yield).

The maximum absorption wavelength $\lambda_{max}$ of the obtained dye 1-23 was 548.8 nm (in ethyl acetate solution); and m/z (POSI) was 663.

Example 6

Synthesis of Azo Dye 1-29

1.50 g (2.62 mmol) of the dye (A-5) and 450 mg (3.93 mmol) of a heterylating agent (7) were dissolved in 50 mL of DMAc. The solution was caused to react for 1 hour at 100° C. The reaction liquid was cooled, 300 mL of water was added, and a product that deposited was separated by filtration under reduced pressure. The crude crystals obtained were purified by silica gel column chromatography to thereby obtain the dye 1-29. The amount obtained of the dye 1-29 was 1.3 g (73.9% yield).

The maximum absorption wavelength $\lambda_{max}$ of the obtained dye 1-29 was 550.8 nm (in ethyl acetate solution); and m/z (POSI) was 672.

Synthesis of dye 1-23

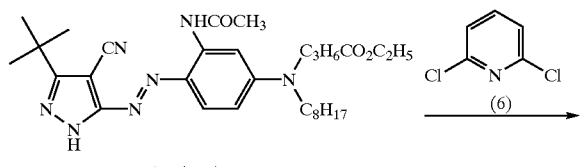

dye (A-4)

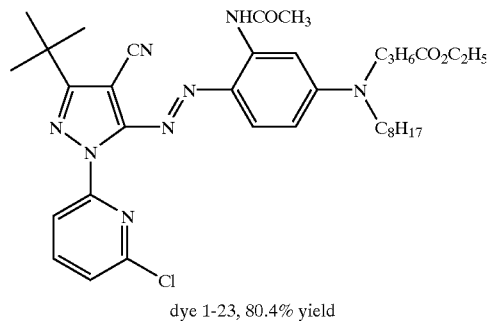

dye 1-23, 80.4% yield

Synthesis of dye-1-29

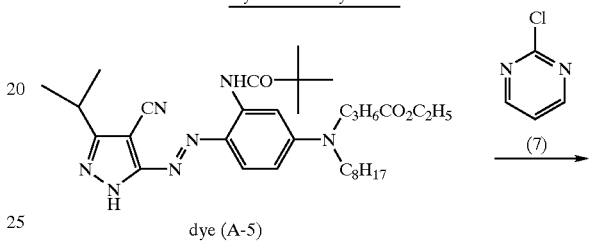

dye (A-5)

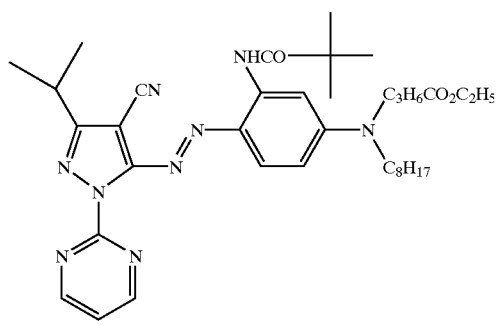

dye 1-29, 73.9% yield

Example 7

Synthesis of Azo Dye 1-31

2.68 g (5.24 mmol) of the dye (A-6) and 1.1 g (5.77 mmol) of cyanuric chloride were dissolved in 50 mL of tetrahydrofuran (THF). While this reaction liquid was stirred at 0° C., 310 mg of sodium carbonate was added in aliquots. After confirmation that the sodium carbonate had disappeared, 2.62 g (21 mmol) of taurine which had been neutralized with triethylamine, 50 mL of DMAc, and 50 mL of water were added. The reaction liquid was then caused to react for 1 hour at 80° C. After completion of the reaction, 300 mL of a saturated sodium chloride aqueous solution was added, and a product that deposited was separated by filtration under reduced pressure. The crude crystals obtained were purified by recrystallization from 100 mL of a 1:1 (by volume) mixture of methanol and water to thereby obtain the dye 1-31. The amount obtained of the dye 1-31 was 3 g (65% yield).

The maximum absorption wavelength $\lambda_{max}$ of the obtained dye 1-31 was 538.5 nm (in ethyl acetate solution); and m/z (POSI) was 811.

Synthesis of dye 1-31

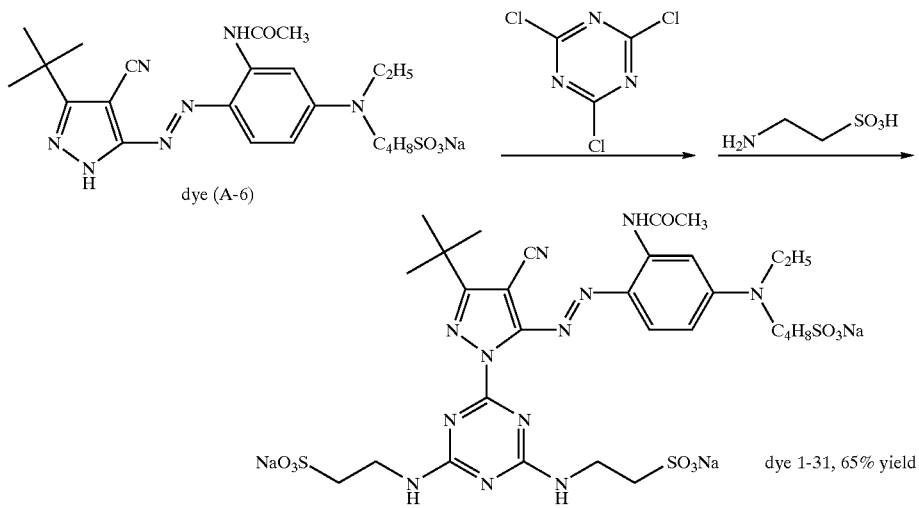

Example 8
(Preparation of Aqueous Ink)

While being heated at 30 to 40° C., the following components were stirred for 1 hour. After that, this liquid was subjected to pressurized filtration through a micro-filter having an average pore diameter of 0.8 μm and a diameter of 47 mm. In this way, an ink liquid A was prepared.

| Composition of ink liquid A | |
|---|---|
| Azo dye (exemplary compound 1-1) | 4 parts by weight |
| Diethylene glycol | 9 parts by weight |
| Tetraethylene glycol monobutyl ether | 9 parts by weight |
| Glycerin | 7 parts by weight |
| Diethanolamine | 1 part by weight |
| Water | 70 parts by weight |

Ink liquids B to G were prepared in the same way as preparation of the ink liquid A, except that the azo dye was changed as shown in Table 1 below.

(Image Recording and Evaluation)

Using each of the ink liquids A to G prepared above, images were recorded on photographic glossy paper (SUPER PHOTOGRADE, ink-jet paper manufactured by Fuji Photo Film Co., Ltd.) by means of an ink-jet printer (PM-700C manufactured by Seiko-Epson Co., Ltd.).

Hue and lightfastness of the obtained images were evaluated.

For to the hue, the evaluation was conducted visually and results were expressed in 3 ratings of "Best", "Good", and "Poor". The results are shown in Table 1. In Table 1, ○ indicates "best"; Δ indicates "good"; and × indicates "poor".

The lightfastness evaluation was conducted in the following way. Immediately after image recording, image density Ci was measured. After that, the image was irradiated with xenon light (85,000 lux) by means of a weather-o-meter (ATLAS C. 165) for 7 days, and then the image density Cf was measured again. Using an image density difference between before and after the irradiation with xenon light, dye residual rate ({(Ci−Cf)/Ci}×100%) was calculated and used for the evaluation. The image density was measured using a reflection densitometer (X-RITE 310TR). The dye residual rate was measured at 3 points of reflection densities, i.e., 1, 1.5, and 2.0. The ratings are shown in Table 1. In Table 1, ○ indicates that the dye retention rates were 80% or more at all three densities; Δ indicates that the dye retention rates were less than 80% at two of the densities; and × indicates that the dye retention rates were less than 80% at all the densities.

TABLE 1

| Ink liquid | Dye | Hue (rating) | Lightfastness rating |
|---|---|---|---|
| A | Azo dye 1-1 | Magenta (○) | ○ |
| B | Azo dye 1-3 | Magenta (○) | ○ |
| C | Azo dye 1-20 | Magenta (○) | ○ |
| D | Azo dye 1-31 | Magenta (○) | ○ |
| E | Comparative dye (A) | Magenta (Δ) | X |
| F | Comparative dye (B) | Magenta (X) | Δ |
| G | Comparative dye (C) | Magenta (X) | Δ |
| H | Comparative dye (D) | Magenta (X) | Δ |

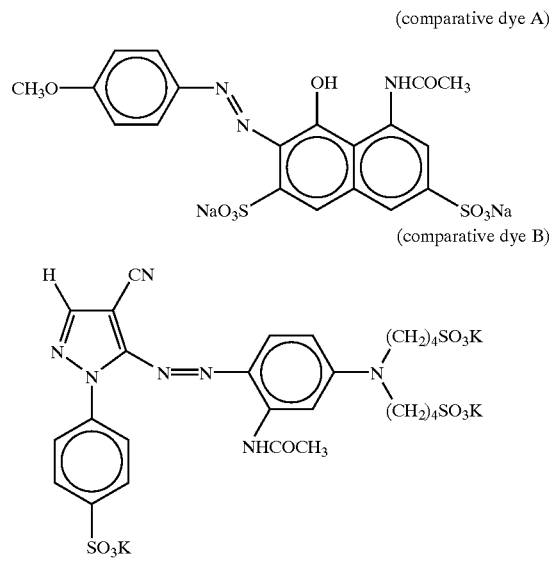

-continued (comparative dye C)

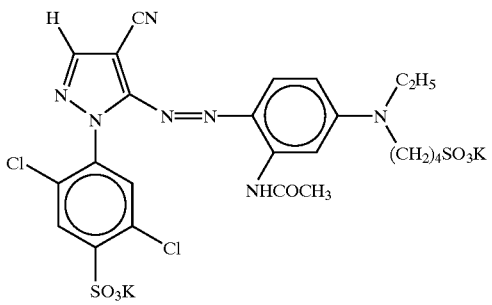

(comparative dye D)

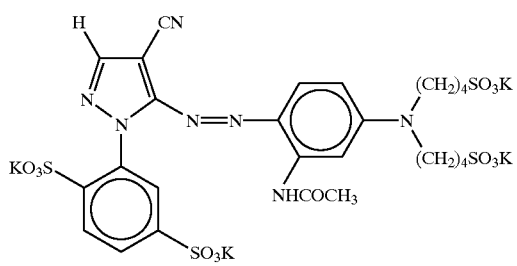

As can be seen from the results shown in Table 1, the magenta images formed by the ink liquids A to D were clearer than the magenta images formed by the ink liquids E to G. The images formed by the ink liquids A to D also exhibited superior lightfastness.

Further, using each of the ink liquids A to G, images were recorded on super-fine special-purpose glossy paper for (MJA4S3P manufactured by Seiko-Epson Co., Ltd.) by means of an ink-jet printer (PM-700C manufactured by Seiko-Epson Co., Ltd.). Evaluation of the hue and lightfastness of the images obtained gave the same results as those in Table 1.

Example 9

(Preparation of Sample 101)

5.63 g of an oil-soluble dye (1-5), 7.04 g of sodium dioctylsulfosuccinate, 4.22 g of a high-boiling point organic solvent (S-2) and 5.63 g of a high-boiling point organic solvent (S-11) were dissolved in 50 mL of ethyl acetate at 70° C. After that, 500 mL of deionized water was added to this solution, while the solution was being stirred by means of a magnetic stirrer, so as to prepare an oil-in-water type, coarse dispersion. The coarse dispersion thus obtained was passed through a micro-fluidizer (MICROFLUIDEX INC.) 5 times under a pressure of 600 bar so as to obtain an emulsion having finer particles. Next, the emulsion underwent a solvent-removing treatment by means of a rotary evaporator, until an odor of ethyl acetate disappeared. In this way, a fine emulsion of a hydrophobic dye was obtained. Then, 140 g of diethylene glycol, 50 g of glycerin, 7 g of SURFYNOL 465 (Air Products & Chemicals Inc.), and 900 mL of deionized water were added to the fine emulsion to thereby prepare ink Sample 101.

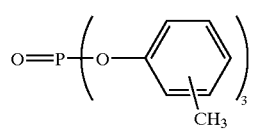

S-2

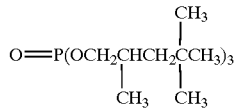

S-11

(Preparation of Samples 102 to 110)

Samples 102 to 110 were prepared in the same way as the preparation of Sample 101, except that the oil-soluble dye (1-5) was changed to other oil-soluble dyes as shown in Table 2 below.

The volume-average particle sizes of the emulsified dispersions of ink of Samples 101 to 110 were measured by means of MICROTRACKUPA (Nikkisou Co., Ltd.). The results are shown in Table 2.

(Preparation of Comparative Sample 111)

While being heated at 30 to 40° C., the following components were stirred for 1 hour. After that, this liquid was subjected to pressurized filtration through a micro-filter having an average pore diameter of 0.8 μm and a diameter of 47 mm. In this way, an ink liquid of Comparative Sample 111 was prepared.

| | |
|---|---|
| Azo dye (comparative dye A) | 4 parts by weight |
| Diethylene glycol | 9 parts by weight |
| Tetraethylene glycol monobutyl ether | 9 parts by weight |
| Glycerin | 7 parts by weight |
| Diethanolamine | 1 part by weight |
| Water | 70 parts by weight |

Next, using each of ink Samples 101 to 110 and Comparative Sample 111, images were formed and the images were evaluated. The evaluation results are shown in Table 2. In Table 2, "color", "paper dependence", "water resistance", and "lightfastness" are the test results of images which were recorded on photographic glossy paper (INK JET PAPER, PHOTOGRADE, manufactured by Fuji Photo Film Co., Ltd.) by means of an ink-jet printer (PM-700C, manufactured by Epson Co., Ltd.) using each ink sample.

(Color)

The recorded images were inspected and given either an "A" (good) or a "B" (poor) rating.

(Paper Dependence)

Color difference between the image recorded on the photographic glossy paper described above and an image recorded on PPC plain paper was inspected. An "A" (good) rating was given if the difference was slight, while a "B" (poor) rating was given if the difference was large.

(Water Resistance)

The photographic glossy paper having an image formed thereon was dried for 1 hour at room temperature, the paper was then immersed in water for 30 seconds, and thereafter underwent natural drying at room temperature. A degree of blur was inspected. An "A" rating was given if blur was not found, a "B" rating was given if slight blur was found, and "C" rating was given if blur was obvious.

(Lightfastness)

The lightfastness evaluation was conducted in the following way. The image on the photographic glossy paper was irradiated with xenon light (85,000 lux) by means of a weather-o-meter (ATLAS C. 165) for 3 days and the image density was measured using a reflection densitometer (X-RITE 310TR). Image densities before and after the irradiation with xenon light were measured and a difference was used to calculate as the dye retention rate for the evaluation. The measurement was made at 3 points of reflection densities, i.e., 1, 1.5, and 2.0. "A" indicates that the dye retention rates were 70% or more at all the densities; "B" indicates that the dye retention rates were less than 70% at one or two of the densities; and "C" indicates that the dye retention rates were less than 70% at all the densities.

TABLE 2

| Sample number | Dye | Particle diameter (nm) | Color | Paper dependence | Water resistance | Lightfastness | Remarks |
|---|---|---|---|---|---|---|---|
| Sample 101 | 1-5 | 56 | A | A | A | A | Present invention |
| Sample 102 | 1-6 | 48 | A | A | A | A | Present invention |
| Sample 103 | 1-7 | 63 | A | A | A | A | Present invention |
| Sample 104 | 1-11 | 60 | A | A | A | A | Present invention |
| Sample 105 | 1-13 | 58 | A | A | A | A | Present invention |
| Sample 106 | 1-19 | 65 | A | A | A | A | Present invention |
| Sample 107 | 1-21 | 70 | A | A | A | A | Present invention |
| Sample 108 | 1-24 | 66 | A | A | A | A | Present invention |
| Sample 109 | 1-27 | 85 | A | A | A | A | Present invention |
| Sample 110 | 1-33 | 78 | A | A | A | A | Present invention |
| Sample 111 | Comparative dye A | — | A | B | B | B | Comparative Example |

As can be seen from the results shown in Table 2, Samples 101 to 110, which were all the ink-jet printing ink of the present invention, exhibited excellent color developability, good color, little paper dependence, superior water resistance, and superior lightfastness.

Example 10

The ink, which was prepared as Samples 101 to 111 in Example 9 was loaded into cartridges of an ink jet printer "BJ-F850 (manufactured by Canon Co., Ltd.). Images were printed using the ink jet printer on photographic glossy paper GP-301 (also manufactured by Canon Co., Ltd.). After the same tests as in Example 9, the evaluation results obtained were the same as those of Example 9.

Example 11

(Preparation of Aqueous Ink)

While being heated at 30 to 40° C., the following components were stirred for 1 hour. After that, this liquid was subjected to pressurized filtration through a micro-filter having an average pore diameter of 0.8 μm and a diameter of 47 mm. In this way, an ink liquid I was prepared.

| Composition of ink liquid I | |
|---|---|
| Azo dye (exemplary compound 101) | 4 parts by weight |
| Diethylene glycol | 9 parts by weight |
| Tetraethylene glycol monobutyl ether | 9 parts by weight |
| Glycerin | 7 parts by weight |
| Diethanolamine | 1 part by weight |
| Water | 70 parts by weight |

Ink liquids J to L were prepared in the same way as the preparation of the ink liquid I, except that the azo dye was changed as shown in Table 3 below.

(Image Recording and Evaluation)

Using each of the ink liquids I to L prepared above, images were recorded on photographic glossy paper (SUPER PHOTOGRADE, ink jet paper manufactured by Fuji Photo Film Co., Ltd.) by means of an ink-jet printer (PM-700C manufactured by Seiko-Epson Co., Ltd.).

Hue and lightfastness of the obtained images were evaluated. For the hue, the evaluation was visually conducted and the results were expressed in 3 ratings of "Best", "Good", and "Poor". The results are shown in Table 3. In Table 3, ○ indicates "best"; Δ indicates "good"; and × indicates "poor". The lightfastness evaluation was conducted in the following way. Immediately after image recording, the image density Ci was measured. After that, the image was irradiated with xenon light (85,000 lux) by means of a weather-o-meter (ATLAS C. 165) for 7 days and then image density Cf was measured again. Using an image density difference between before and after the irradiation with xenon light, the dye retention rate ({(Ci−Cf)/Ci}×100%) was calculated and used for the evaluation. The image density was measured using a reflection densitometer (X-RITE 310TR). The dye retention rate was measured at 3 points of reflection densities, i.e., 1, 1.5, and 2.0. The ratings are shown in Table 1. In Table 3, ○ indicates that the dye retention rates were 80% or more at all the densities; Δ indicates that the dye retention rates were less than 80% at two of the densities; and × indicates that the dye retention rates were less than 80% at all the densities. In addition, the evaluation results of the ink liquids E to H prepared previously are also shown in Table 3.

TABLE 3

| Ink liquid | Dye | Hue (rating) | Lightfastness rating |
|---|---|---|---|
| I | Azo dye 101 | Magenta (○) | ○ |
| J | Azo dye 102 | Magenta (○) | ○ |
| K | Azo dye 103 | Magenta (○) | ○ |
| L | Azo dye 106 | Magenta (○) | ○ |
| E | Comparative dye (A) | Magenta (Δ) | X |

TABLE 3-continued

| Ink liquid | Dye | Hue (rating) | Lightfastness rating |
|---|---|---|---|
| F | Comparative dye (B) | Magenta (X) | Δ |
| G | Comparative dye (C) | Magenta (X) | Δ |
| H | Comparative dye (D) | Magenta (X) | Δ |

As can be seen from Table 3, the magenta images formed by the ink liquids I to L were clearer than the magenta images formed by the ink liquids E to G. The images formed by the ink liquids I to L exhibited superior lightfastness.

Further, using each of the ink liquids I to L, images were recorded on super-fine special-purpose glossy paper (MJA4S3P manufactured by Seiko-Epson Co., Ltd.) by means of an ink-jet printer (PM-700C manufactured by Seiko-Epson Co., Ltd.). Evaluation of the hue and lightfastness of the images obtained gave the same results as those of Table 3.

As stated above, the use of the novel azo dye of the present invention made it possible to provide ink-jet printing ink and an ink-jet recording method capable of forming images having good hue and high lightfastness. The manufacturing process according to the present invention enabled the production of the azo dye with a high yield.

What is claimed is:

1. An azo dye represented by general formula (10) as follows:

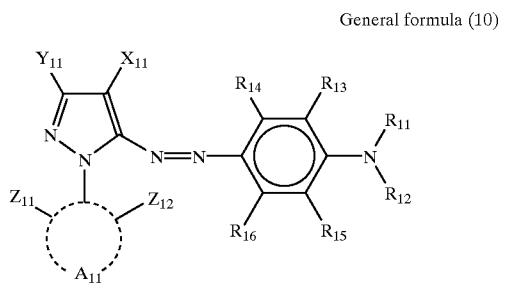

General formula (10)

wherein $X_{11}$ represents an electron-withdrawing group having a Hammett's constant $\sigma_p$ of at least 0.20; $R_{11}$, $R_{12}$, $R_{13}$, $R_{14}$, $R_{15}$, $R_{16}$ and $Y_{11}$ each independently represents a hydrogen atom, a halogen atom, an alkyl group, a cycloalkyl group, an alkenyl group, an aralykl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclicoxy group, an azo group, an acyloxy group, a carbamoyloxy group, a silyloxy group, an aryloxycarbonyl group, an arloxycarbonylamino group, an imido group, a heterocyclicthio group, a sulfinyl group, a phosphoryl group, an acyl group, or an ionic hydrophilic group; each of pairs $R_{11}$ and $R_{12}$, $R_{13}$ and $R_{11}$, $R_{12}$ and $R_{15}$ may be joined to form a ring; $A_{11}$ represents a group made up of nonmetallic atoms necessary for forming a 5- to 8-membered ring, which may be a saturated ring and may have an unsaturated bond; wherein at least 3 of the nonmetallic atoms in the group represented by $A_{11}$ are bonded to an N atom of a pyrazole ring, $Z_{11}$, and $Z_{12}$, respectively; wherein the atom bonded to the N atom of the pyrazole ring is adjacent to both the atom bonded to $Z_{11}$ and the atom bonded to $Z_{12}$; wherein $Z_{11}$ and $Z_{12}$ each independently represents a halogen atom, an alkyl group, a cyano group, an alkoxy group, or an ionic hydrophilic group; and wherein at least one of $R_{11}$ and $R_{12}$ represents an ionic hydrophilic group or has an ionic hydrophilic group as a substituent.

2. Azo dye represented by general formula (12) as follows:

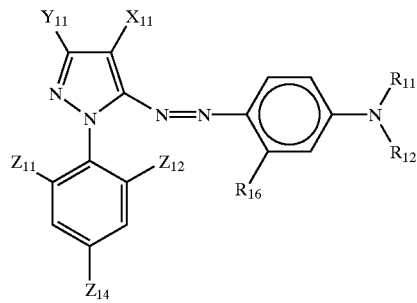

General formula (12)

wherein $X_{11}$ represents an electron-withdrawing group having a Hammett's constant $\sigma_p$ of at least 0.20; $R_{11}$ and $R_{12}$ each independently represents an alkyl group which may have an ionic group as a substituent; $R_{16}$, $Z_{14}$ and $Y_{11}$ each independently represents one of a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclicoxy group, an azo group, an acyloxy group, a carbamoyloxy group, a silyloxy group, an aryloxycarbonyl group, an arloxycarbonylamino group, an imido group, a heterocyclicthio group, a sulfinyl group, a phosphoryl group, an acyl group, and an ionic hydrophilic group, each of which groups may have at least one substituent; and $R_{11}$ and $R_{12}$ may be joined to form a ring; $Z_{11}$ and $Z_{12}$ each independently represents a halogen atom, an alkyl group, a cyano group, an alkoxy group, or an ionic hydrophilic group; and at least one of $R_{11}$ and $R_{12}$ has an ionic hydrophilic group as a substituent.

3. The azo dye according to claim 1, wherein the ionic hydrophilic group is one of a carboxyl group and a sulfo group.

4. The azo dye according to claim 1, wherein X represents an electron-withdrawing group having a Hammett's constant $\sigma_p$ of at least 0.30 and at most 1.0.

5. The azo dye according to claim 1, wherein the X which represents an electron-withdrawing group having a Hammett's constant $\sigma_p$ of at least 0.20 is a group selected from the group consisting of acyl groups, acyloxy groups, carbamoyl groups, alkyloxycarbonyl groups, aryloxycarbonyl groups, cyano groups, nitro groups, dialkylphosphono groups, diarylphosphono groups, diarylphosphinyl groups, alkylsulfinyl groups, arylsulfinyl groups, alkylsulfonyl groups, arylsulfonyl groups, sulfonyloxy groups, acylthio groups, sulfamoyl groups, thiocyanate groups, thiocarbonyl groups, halogenated alkyl groups, halogenated alkoxy groups, halogenated aryloxy groups, halogenated alkylamino groups, halogenated alkylthio groups, aryl groups substituted with other electron-withdrawing group having $\sigma_p$ value of 0.20 or greater, heterocyclic groups, halogen atoms, azo groups, and selenocyanate groups.

6. The azo dye according to claim 2, wherein the ionic hydrophilic group is one of a carboxyl group and a sulfo group.

7. The azo dye according to claim 2, wherein X represents an electron-withdrawing group having a Hammett's constant $\sigma_p$ of at least 0.30 and at most 1.0.

8. The azo dye according to claim 2, wherein the X which represents an electron-withdrawing group having a Hammett's constant $\sigma_p$ of at least 0.20 is a group selected from the group consisting of acyl groups, acyloxy groups, carbamoyl groups, alkyloxycarbonyl groups, aryloxycarbonyl groups, cyano groups, nitro groups, dialkylphosphono groups, diarylphosphono groups, diarylphosphinyl groups, alkylsulfinyl groups, arylsulfinyl groups, alkylsulfonyl groups, arylsulfonyl groups, sulfonyloxy groups, acylthio groups, sulfamoyl groups, thiocyanate groups, thiocarbonyl groups, halogenated alkyl groups, halogenated alkoxy groups, halogenated aryloxy groups, halogenated alkylamino groups, halogenated alkylthio groups, aryl groups substituted with other electron-withdrawing group having $\sigma_p$ value of 0.20 or greater, heterocyclic groups, halogen atoms, azo groups, and selenocyanate groups.

* * * * *